United States Patent
Plotnikov et al.

(10) Patent No.: US 10,877,758 B2
(45) Date of Patent: Dec. 29, 2020

(54) COLLAPSING OF MULTIPLE NESTED LOOPS, METHODS, AND INSTRUCTIONS

(71) Applicant: Intel Corporation, Santa Clara, CA (US)

(72) Inventors: Mikhail Plotnikov, Nizhny Novgorod (RU); Andrey Naraikin, Nizhny Novgorod (RU); Elmoustapha Ould-Ahmed-Vall, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/120,983

(22) Filed: Sep. 4, 2018

(65) Prior Publication Data

US 2018/0373538 A1 Dec. 27, 2018

Related U.S. Application Data

(60) Continuation of application No. 15/478,520, filed on Apr. 4, 2017, now Pat. No. 10,108,418, which is a division of application No. 13/728,506, filed on Dec. 27, 2012, now Pat. No. 9,619,229.

(51) Int. Cl.
*G06F 9/30* (2018.01)
*G06F 9/32* (2018.01)

(52) U.S. Cl.
CPC ........ *G06F 9/30145* (2013.01); *G06F 9/3016* (2013.01); *G06F 9/30018* (2013.01); *G06F 9/30021* (2013.01); *G06F 9/30036* (2013.01); *G06F 9/30065* (2013.01); *G06F 9/325* (2013.01)

(58) Field of Classification Search
CPC .................................................. G06F 9/30145
USPC .......................................................... 717/150
See application file for complete search history.

(56) References Cited

U.S. PATENT DOCUMENTS

| 5,471,597 | A | 11/1995 | Byers et al. |
| 5,802,375 | A * | 9/1998 | Ngo ......... G06F 8/452 717/150 |
| 7,945,768 | B2 * | 5/2011 | Essick, IV ......... G06F 9/325 712/241 |
| 8,510,534 | B2 | 8/2013 | Van Berkel et al. |
| 9,619,229 | B2 | 4/2017 | Plotnikov et al. |
| 2002/0083305 | A1 * | 6/2002 | Renard ......... G06F 9/325 712/220 |

(Continued)

FOREIGN PATENT DOCUMENTS

WO 2013095601 A1 6/2013

OTHER PUBLICATIONS

Dorit et al, Outer-Loop Vectorization . . . , ACM, Oct. 25, 2008, p. 2-11.*

*Primary Examiner* — John Q Chavis
(74) *Attorney, Agent, or Firm* — Trop, Pruner & Hu, P.C.

(57) ABSTRACT

In an embodiment, the present invention is directed to a processor including a decode logic to receive a multi-dimensional loop counter update instruction and to decode the multi-dimensional loop counter update instruction into at least one decoded instruction, and an execution logic to execute the at least one decoded instruction to update at least one loop counter value of a first operand associated with the multi-dimensional loop counter update instruction by a first amount. Methods to collapse loops using such instructions are also disclosed. Other embodiments are described and claimed.

7 Claims, 21 Drawing Sheets

(56) References Cited

U.S. PATENT DOCUMENTS

| | | | |
|---|---|---|---|
| 2002/0188824 A1* | 12/2002 | Ganapathy | G06F 17/10 |
| | | | 712/35 |
| 2005/0240644 A1* | 10/2005 | Van Berkel | G06F 9/30025 |
| | | | 708/441 |
| 2006/0107028 A1 | 5/2006 | Meuwissen et al. | |
| 2010/0042815 A1* | 2/2010 | Gonion | G06F 9/3887 |
| | | | 712/222 |
| 2010/0118852 A1* | 5/2010 | Codrescu | G06F 9/30021 |
| | | | 370/338 |
| 2012/0317441 A1* | 12/2012 | Gonion | G06F 9/3838 |
| | | | 714/15 |
| 2013/0185496 A1 | 7/2013 | Hessel et al. | |
| 2014/0188961 A1 | 7/2014 | Plotnikov et al. | |
| 2014/0189287 A1 | 7/2014 | Plotnikov et al. | |
| 2017/0041635 A1 | 2/2017 | Ikai et al. | |

* cited by examiner

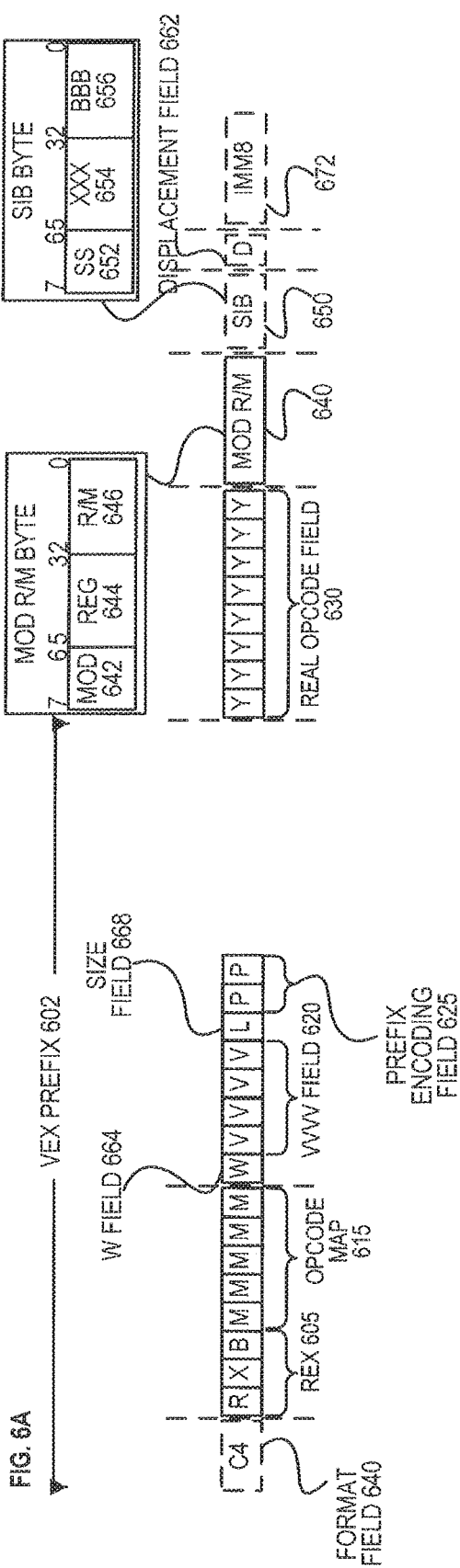
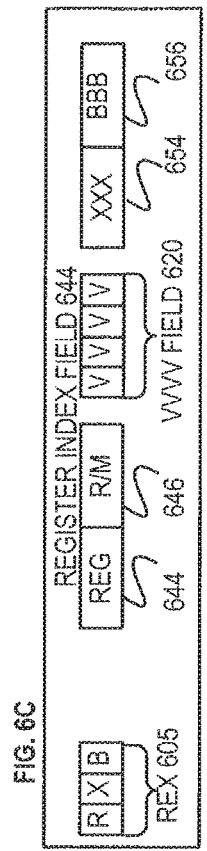
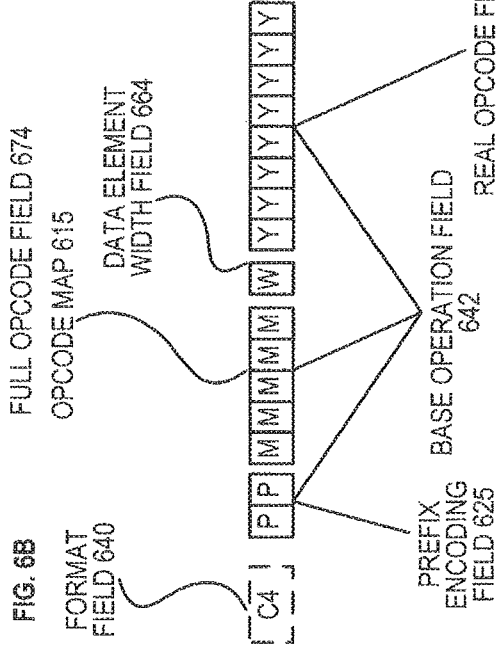
FIG. 6A
FIG. 6B
FIG. 6C

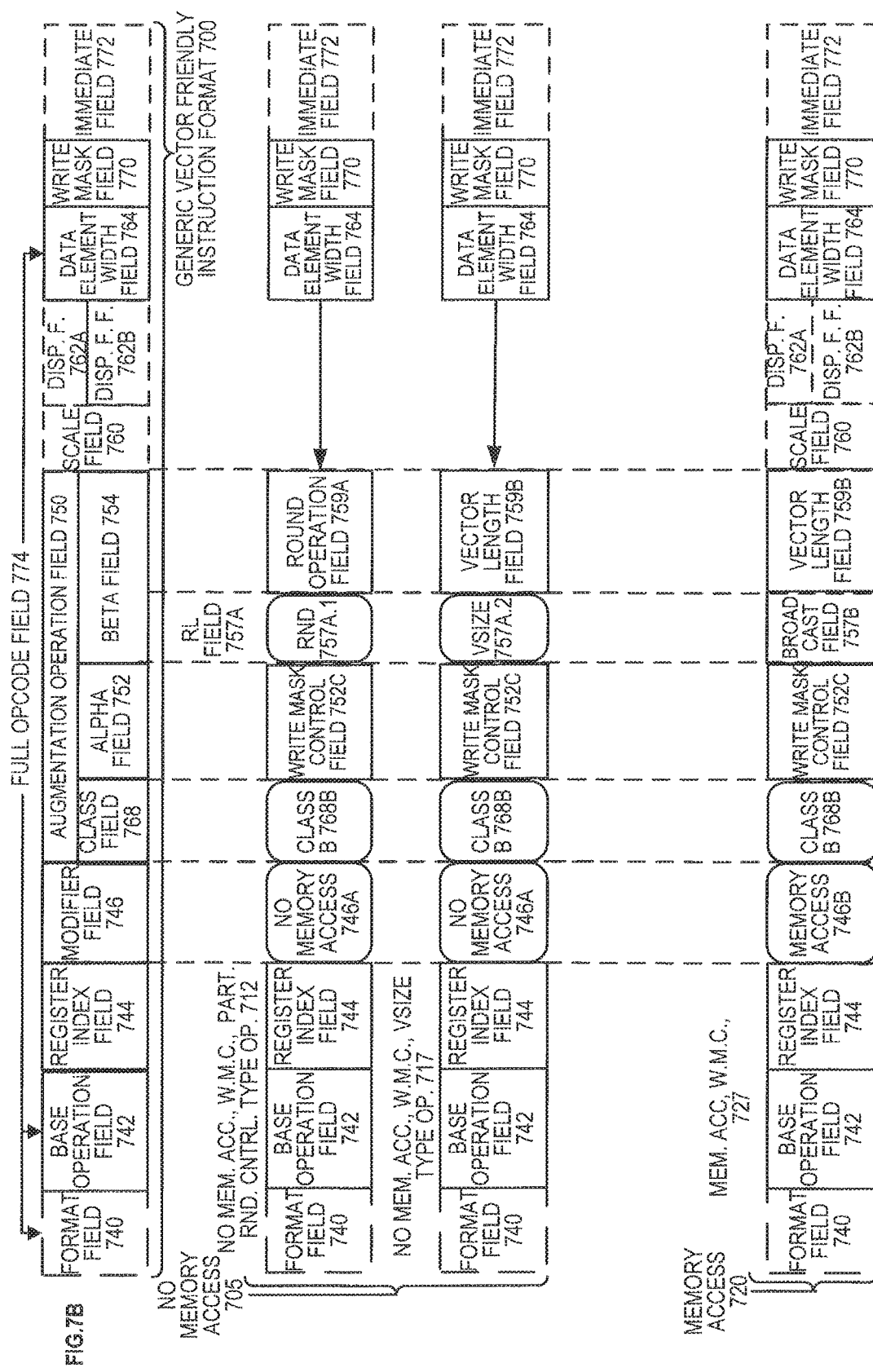

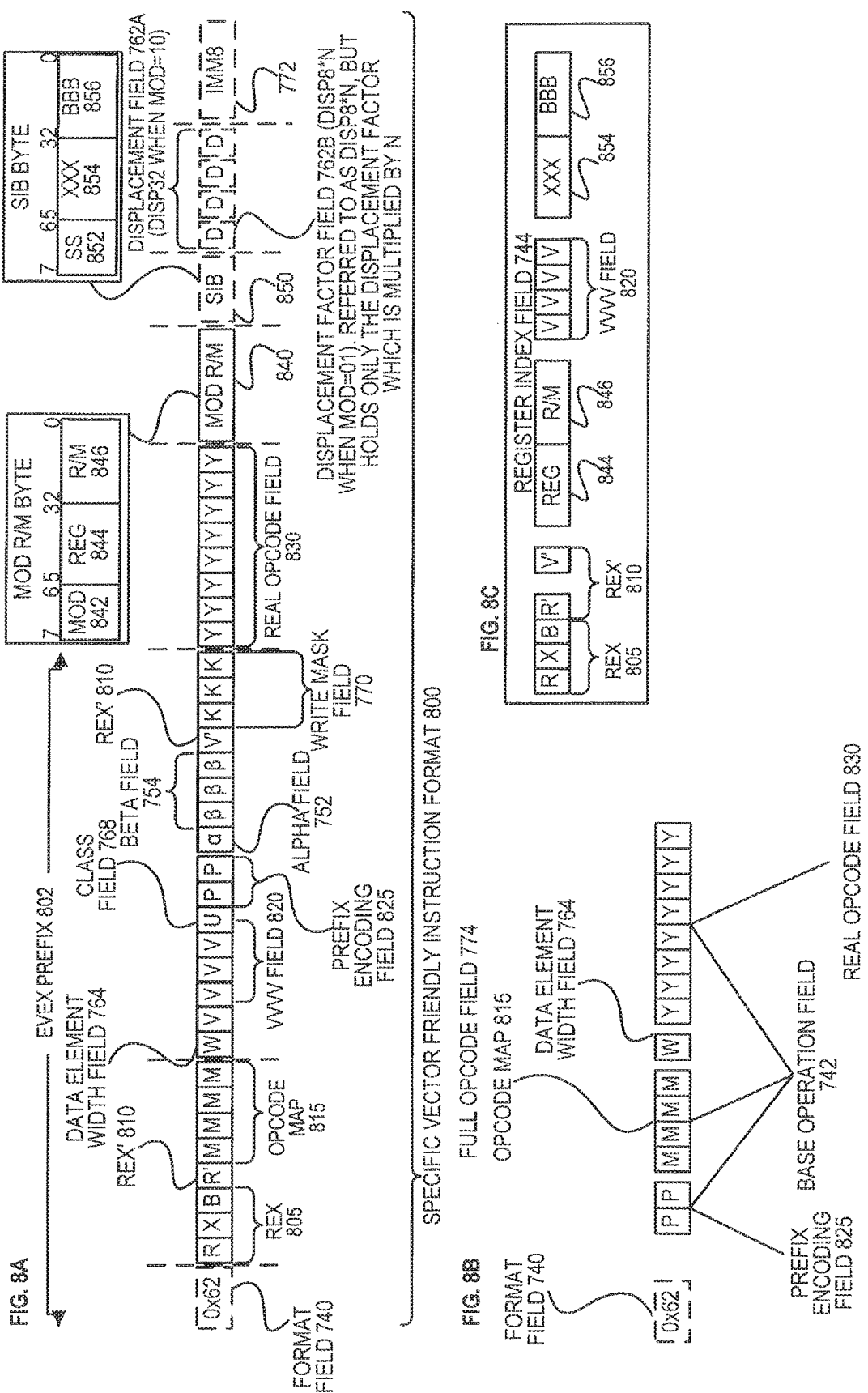

US 10,877,758 B2

COLLAPSING OF MULTIPLE NESTED LOOPS, METHODS, AND INSTRUCTIONS

This application is a continuation of a U.S. patent application Ser. No. 15/478,520, filed Apr. 4, 2017, and entitled "Collapsing of Multiple Nested Loops, Methods, and Instructions", which is a divisional of U.S. patent application Ser. No. 13/728,506, filed Dec. 27, 2012, and entitled "Collapsing of Multiple Nested Loops, Methods, and Instructions", which issued on Apr. 11, 2017, as U.S. Pat. No. 9,619,229. The content of each of the above applications is hereby incorporated by reference.

TECHNICAL FIELD

The present disclosure relates generally to computing platforms and more particularly, to loop collapsing methods, apparatus and instructions.

BACKGROUND

Nested loops, e.g., of two to five times, are very common in high performance computing (HPC) code, for instance. Loop collapsing improves performance by reducing the number of branches and hence the probability of branch mispredictions. A conventional way to collapse multi-nested loops is to create a loop without nests, controlled by a new loop counter that is incremented on every iteration of the collapsed loop. The new loop counter is incremented ($tc_{n-1} * tc_{n-2} * \ldots * tc_0$) times totally, where $tc_j$ is a loop count of the loop over $i_j$. However, the information about individual loop counters needs to be preserved for computations inside the loop and for use as indexes to access multi-dimensional arrays.

Also, while loop collapsing in some cases may improve performance, current compilers rarely can efficiently collapse loops. A few most frequently seen reasons that prevent collapsing include: non-stride memory accesses in n-dimensional array A (after collapsing); existence of accesses to a sub-dimensional array B (m-dimensions, m<n); and existence of computations over separate loop counters ($i_j$).

BRIEF DESCRIPTION OF THE DRAWINGS

FIG. 6A is an illustration of an exemplary AVX instruction format in accordance with an embodiment of the present invention.

FIG. 6B is an illustration in which fields from FIG. 6A make up a full opcode field and a base operation field in accordance with an embodiment of the present invention.

FIG. 6C is an illustration in which fields from FIG. 6A make up a register index field in accordance with an embodiment of the present invention.

FIGS. 7A and 7B are block diagrams illustrating a generic vector friendly instruction format and instruction templates thereof according to embodiments of the invention.

FIG. 8A is a block diagram illustrating an exemplary specific vector friendly instruction format according to embodiments of the invention.

FIG. 8B is a block diagram illustrating the fields of the specific vector friendly instruction format in accordance with one embodiment of the invention.

FIG. 8C is a block diagram illustrating the fields of the specific vector friendly instruction format in accordance with one embodiment of the invention.

DETAILED DESCRIPTION

In various embodiments, loop counters for nested loops may be maintained in a vector format. These multiple loop counters can be modified accordingly at the end of each iteration of a collapsed loop formed of the nested loops. In different embodiments, post-computational loop counter updates may be performed in hardware of a processor responsive to a single instruction.

Embodiments thus may store loop counters of nested loops as a single multi-dimensional loop counter stored in a vector-sized storage such as a vector register of a processor or a vector-sized memory location. The value in this storage may be controlled via one or more instructions for controlling the multi-dimensional loop counter. Different flavors of such instructions may be provided for incrementing and decrementing the counters in a controllable manner, as well as updating various status flags of a processor. In addition, an instruction that calculates offsets inside multi-dimensional arrays may be used to perform loop collapsing. This approach makes it possible to collapse multi-nested loops and using loop counters of nested loops as indexes for accesses to multi-dimensional arrays (including sub-dimensional arrays) or other computations over loop counters of nested loops.

Figure 1:
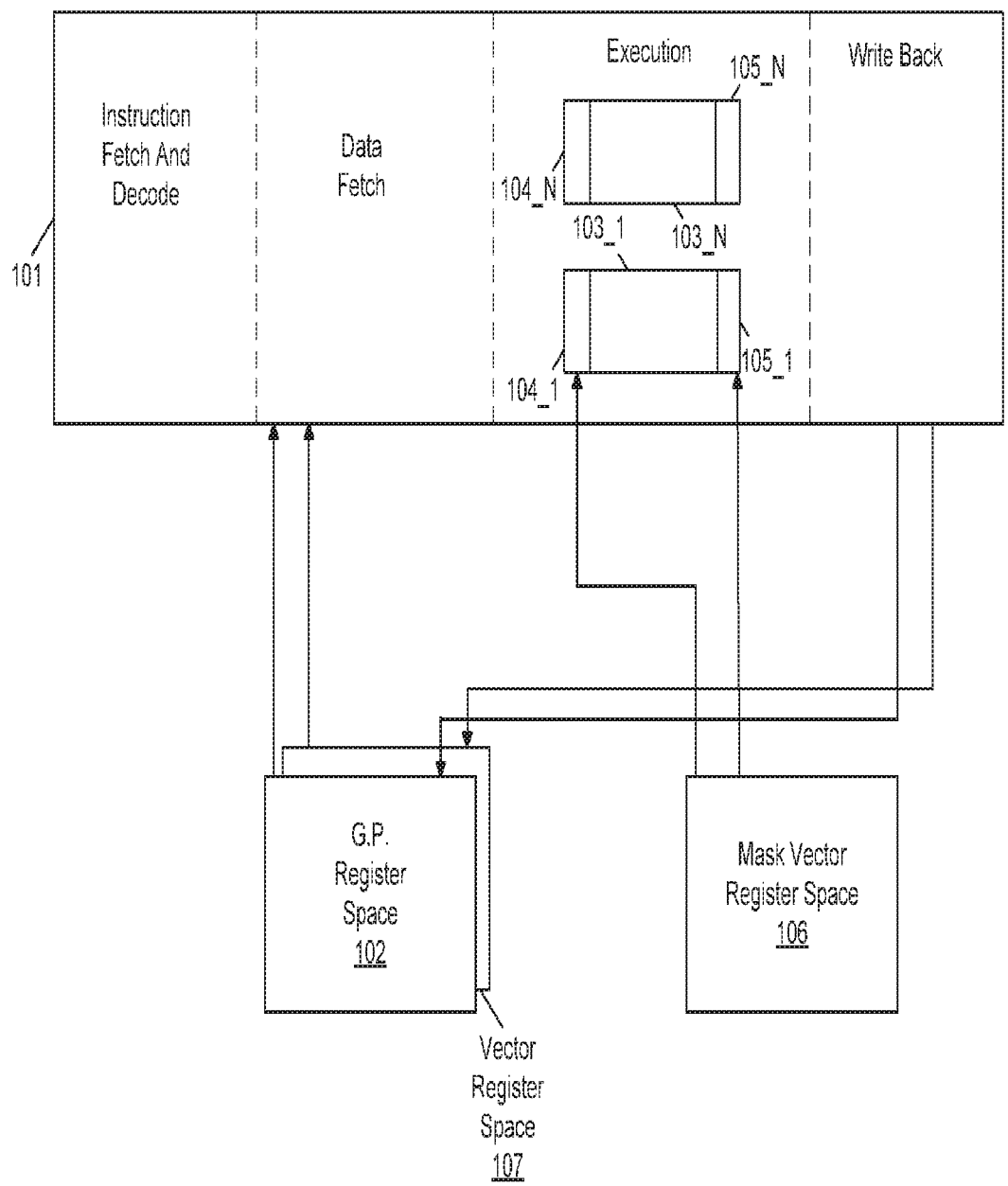
FIG. 1 is a block diagram of a processor pipeline in accordance with an embodiment of the present invention.

FIG. 1 shows a high level diagram of a processing core 100 implemented with logic circuitry on a semiconductor chip. The processing core includes a pipeline 101. The pipeline consists of multiple stages each designed to perform a specific step in the multi-step process needed to fully execute a program code instruction. These typically include at least: 1) instruction fetch and decode; 2) data fetch; 3) execution; 4) write-back. The execution stage performs a specific operation identified by an instruction that was fetched and decoded in prior stage(s) (e.g., in step 1) above) upon data identified by the same instruction and fetched in another prior stage (e.g., step 2) above). The data that is operated upon is typically fetched from (general purpose) register storage space 102. New data that is created at the completion of the operation is also typically "written back" to register storage space (e.g., at stage 4) above).

The logic circuitry associated with the execution stage is typically composed of multiple "execution units" or "functional units" 103_1 to 103_N that are each designed to perform its own unique subset of operations (e.g., a first functional unit performs integer math operations, a second functional unit performs floating point instructions, a third functional unit performs load/store operations from/to cache/memory, etc.). The collection of all operations performed by all the functional units corresponds to the "instruction set" supported by the processing core 100.

Figure 2A:
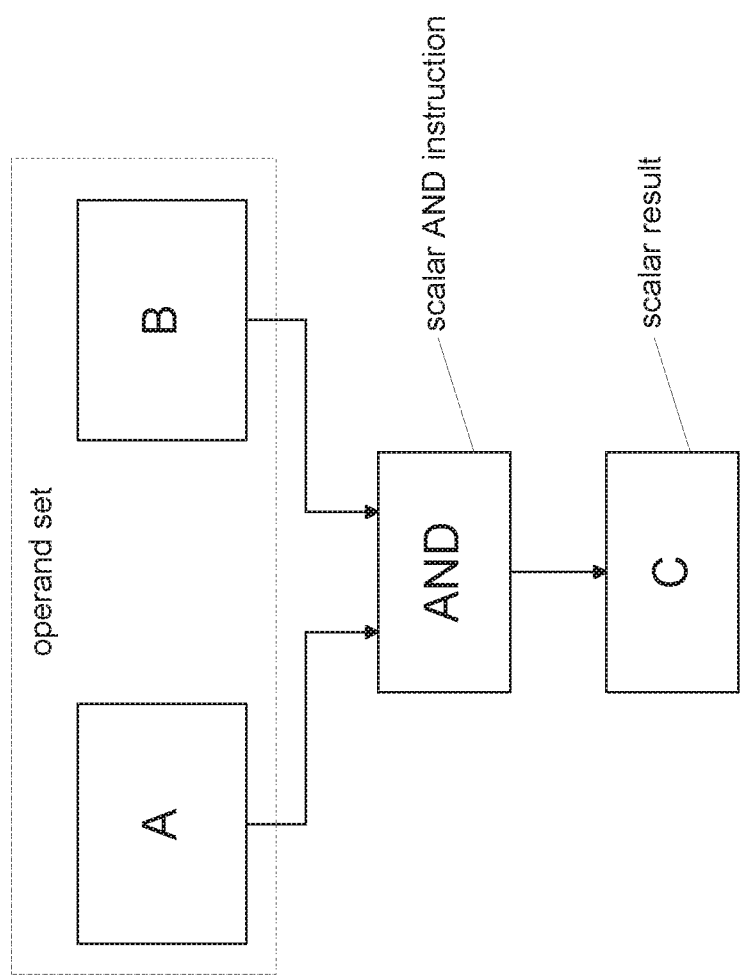
FIGS. 2A and 2B are block diagrams of compare scalar vs. vector operations in accordance with an embodiment of the present invention.
Figure 2B:
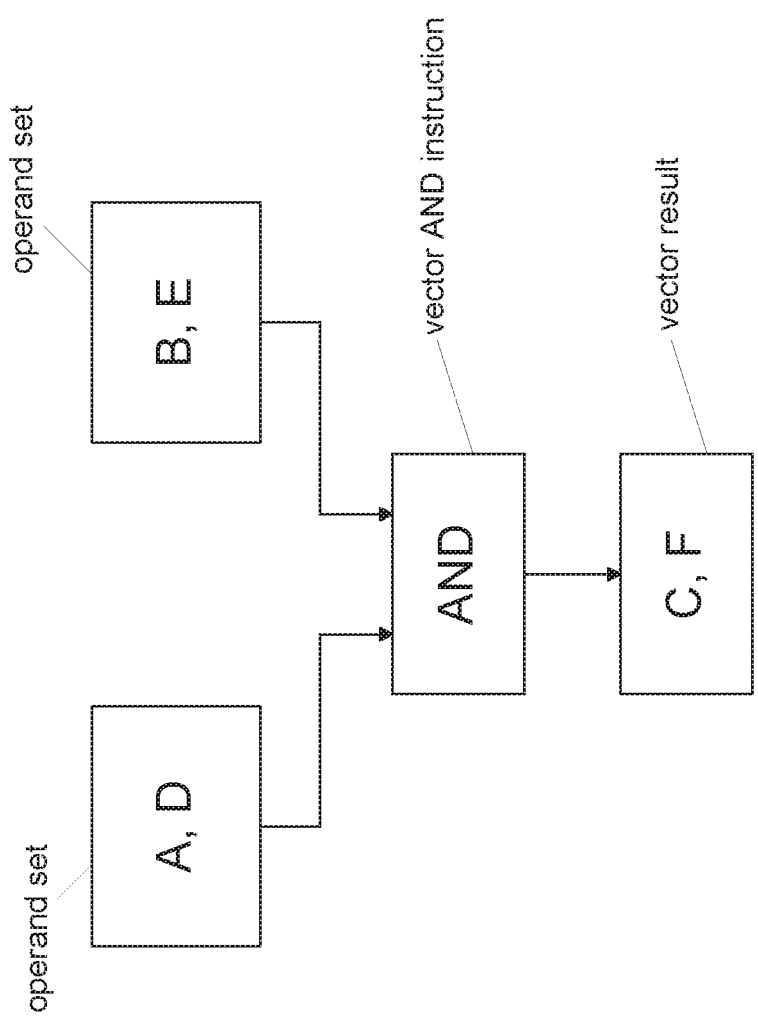

Two types of processor architectures are widely recognized in the field of computer science: "scalar" and "vector". A scalar processor is designed to execute instructions that perform operations on a single set of data, whereas, a vector processor is designed to execute instructions that perform operations on multiple sets of data. FIGS. 2A and 2B present a comparative example that demonstrates the basic difference between a scalar processor and a vector processor.

FIG. 2A shows an example of a scalar AND instruction in which a single operand set, A and B, are ANDed together to produce a singular (or "scalar") result C (i.e., AB=C). By contrast, FIG. 2B shows an example of a vector AND instruction in which two operand sets, A/B and D/E, are respectively ANDed together in parallel to simultaneously produce a vector result C, F (i.e., A.AND.B=C and D.AND.E=F). As a matter of terminology, a "vector" is a data element having multiple "elements". For example, a vector V=Q, R, S, T, U has five different elements: Q, R, S, T and U. The "size" of the exemplary vector V is five (because it has five elements).

FIG. 1 also shows the presence of vector register space 107 that is different than general purpose register space 102. Specifically, general purpose register space 102 is nominally used to store scalar values. As such, when, any of execution units perform scalar operations they nominally use operands called from (and write results back to) general purpose register storage space 102. By contrast, when any of the execution units perform vector operations they nominally use operands called from (and write results back to) vector register space 107. Different regions of memory may likewise be allocated for the storage of scalar values and vector values.

Note also the presence of masking logic 104_1 to 104_N and 105_1 to 105_N at the respective inputs to and outputs from the functional units 103_1 to 103_N. In various implementations, for vector operations, only one of these layers is actually implemented—although that is not a strict requirement (although not depicted in FIG. 1, conceivably, execution units that only perform scalar and not vector operations need not have any masking layer). For any vector instruction that employs masking, input masking logic 104_1 to 104_N and/or output masking logic 105_1 to 105_N may be used to control which elements are effectively operated on for the vector instruction. Here, a mask vector is read from a mask register space 106 (e.g., along with input operand vectors read from vector register storage space 107) and is presented to at least one of the masking logic 104, 105 layers.

Over the course of executing vector program code each vector instruction need not require a full data word. For example, the input vectors for some instructions may only be 8 elements, the input vectors for other instructions may be 16 elements, the input vectors for other instructions may be 32 elements, etc. Masking layers 104/105 are therefore used to identify a set of elements of a full vector data word that apply for a particular instruction so as to effect different vector sizes across instructions. Typically, for each vector instruction, a specific mask pattern kept in mask register space 106 is called out by the instruction, fetched from mask register space and provided to either or both of the mask layers 104/105 to "enable" the correct set of elements for the particular vector operation.

Vector machines can be designed to process "multi-dimensional" data structures, where, each element of the vector corresponds to a unique dimension of the data structure. For example, if a vector machine were to be programmed to contemplate a three dimensional structure (such as a "cube"), a vector might be created having a first element that corresponds to the cube's width, a second element that corresponds to the cube's length and a third element that corresponds to the cube's height.

Those of ordinary skill will understand that computation of multi-dimensional structures in a computing system can entail structures having two or more dimensions including more than three dimensions. For simplicity, however, the present application will mostly provide examples.

Table 1 is an example nested loop that can be collapsed using instructions described herein. Note that the loop collapsing may be performed by a user or a compiler such as a static compiler or a runtime compiler such as a just in time (JIT) compiler. In general, Table 1 shows a nested loop in which updates are made to a first multi-dimensional array A based on computations performed on loop counters of nested loops ($i_j$) and on data elements obtained from a second multi-dimensional array B, based on offsets according to various loop counter values.

TABLE 1 for($i_{n-1}$=istart$_{n-1}$; $i_{n-1}$<= iend$_{n-1}$; $i_{n-1}$+= str$_{n-1}$)
  for($i_{n-2}$=istart$_{n-2}$; $i_{n-2}$<= iend$_{n-2}$; $i_{n-2}$+= str$_{n-2}$)
    ...
      for($i_0$=istart$_0$; $i_0$<= iend$_0$; $i_0$+= str$_0$){
        A[$i_{n-1}$][$i_{n-2}$]...[$i_1$][$i_0$] = Computation(($i_{n-1}$,$i_{n-2}$,...,$i_0$),
        B[$i_{k(m-1)}$][$i_{k(m-2)}$]...[$i_{k1}$][$i_{k0}$])
      }

Figure 3A:
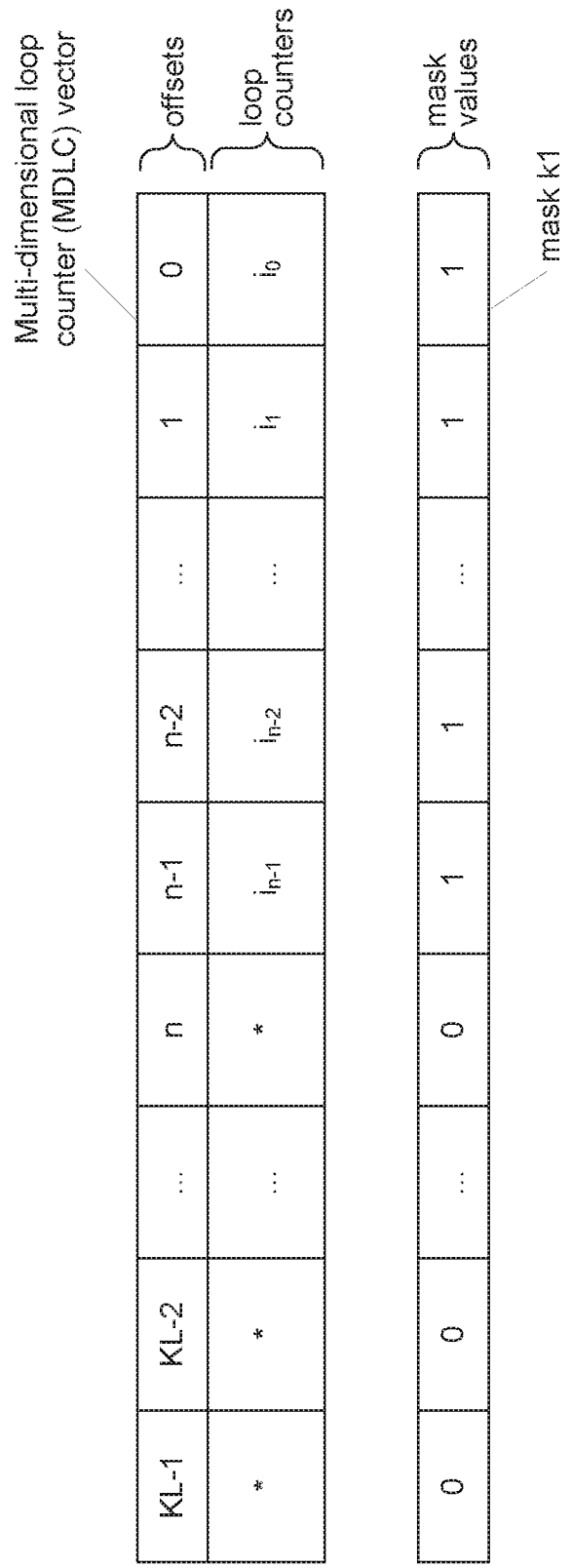
FIG. 3A is a block diagram of a multi-dimensional loop counter vector and an associated mask in accordance with one embodiment of the present invention.

Referring now to FIG. 3A, shown is a block diagram of a multi-dimensional loop counter vector MDLC that includes a plurality of offsets. Note that as here when KL is greater than n, values at offsets greater than or equal to n are undefined, and can be masked out from computations by a mask k1.

In some embodiments these instructions to update a multi-dimensional loop counter modify values of the multi-dimensional loop counter in order to cross to the next iteration of the collapsed loop. There are several implementations, but all of them are intended to do one thing—cross to the next iteration of collapsed loop or, in terms of the collapsed loop, perform an increment operation.

Figure 3B:
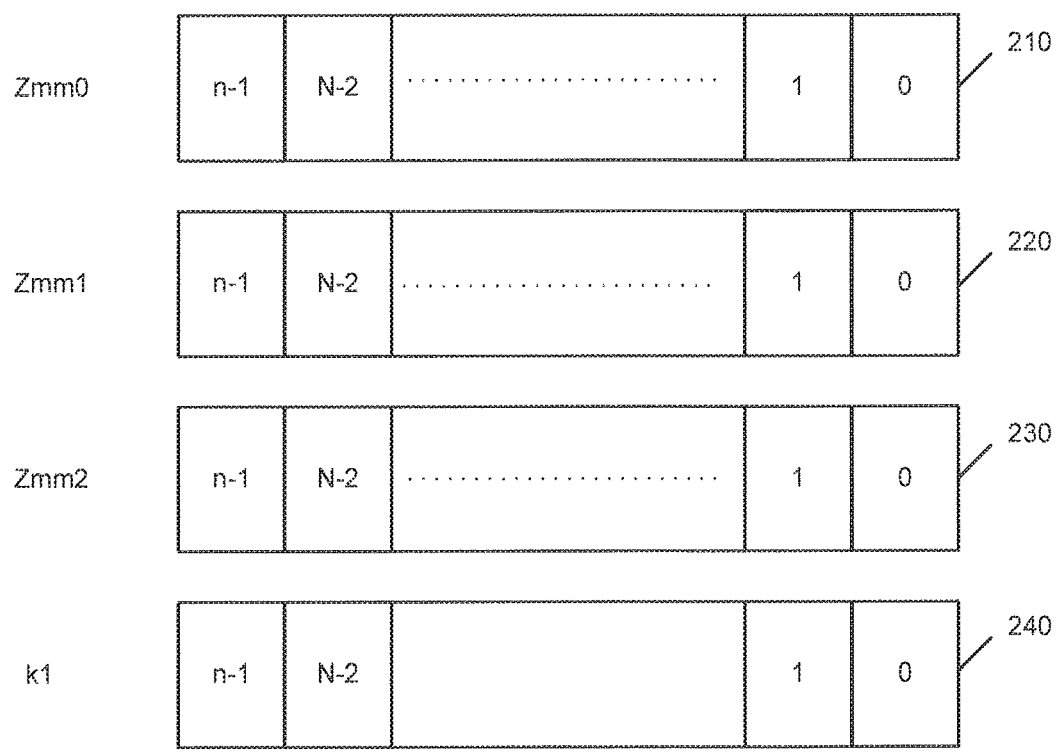
FIG. 3B is a block diagram of values associated with a loop counter update instruction in accordance with an embodiment of the present invention.

Referring now to FIG. 3B, shown are values associated with a loop counter update instruction in accordance with an embodiment of the present invention. As shown in FIG. 3B, various operands and mask values are present. Note that while in particular examples these values may be identified in an instruction as operands or a mask value, in other implementations an immediate value also may be associated with an instruction to identify one or more values for use in execution of the instruction.

As seen in FIG. 3B, a first operand identifies a first storage location 110 (e.g., a vector register ZMM0) which in an embodiment may be an KL-wide register to store KL individual data elements. Although the scope of the present invention is not limited in this regard in different implementations KL may be 8, 16, 32, or another number of individual data elements. For example, if a vector register is 512 bits wide and each loop counter size is 32 bits, then KL=512/32=16. Note that elements at an offset of zero, e.g., zmm[0], are related to an innermost loop, a next offset, e.g., zmm[1], corresponds to a one time outer loop, and finally zmm[n] corresponds to the outermost loop. In an example instruction such as a loop counter update instruction, this register may store the current values for each of the individual loop counters of the multi-dimensional loop counter vector.

In turn, a second operand identifies a second storage location 120 (e.g., a vector register ZMM1) which in an embodiment may be an KL-wide register to store KL individual data elements. In an example loop counter update instruction, this register may store the start values for each of the individual loop counters of the multi-dimensional loop counter vector.

In turn, a third operand identifies a second storage location 130 (e.g., a vector register ZMM2) which in an embodiment may be an KL-wide register to store KL individual data elements. In an example loop counter update instruction, this register may store the end values for each of the individual loop counters of the multi-dimensional loop counter vector.

Finally, FIG. 3B shows an additional storage location 140 such as another vector register that stores a mask k1 including a plurality of elements each used to identify whether a particular loop counter value of the loop counter vector is to be masked during execution of the loop counter update instruction. A mask also may be used when the number of elements that fit into a vector register (KL) is larger than the number of nested loops (n). In this case upper elements of operands starting from offset n may be masked out from computations. Hereafter, it will be assumed that number of loop nests (n) is not more than the number of elements in a vector (KL), and when n<KL it will be assumed that upper elements, starting from offset n, are masked out from multi-dimensional loop counter update computations by an appropriate input mask k1.

Figure 4:
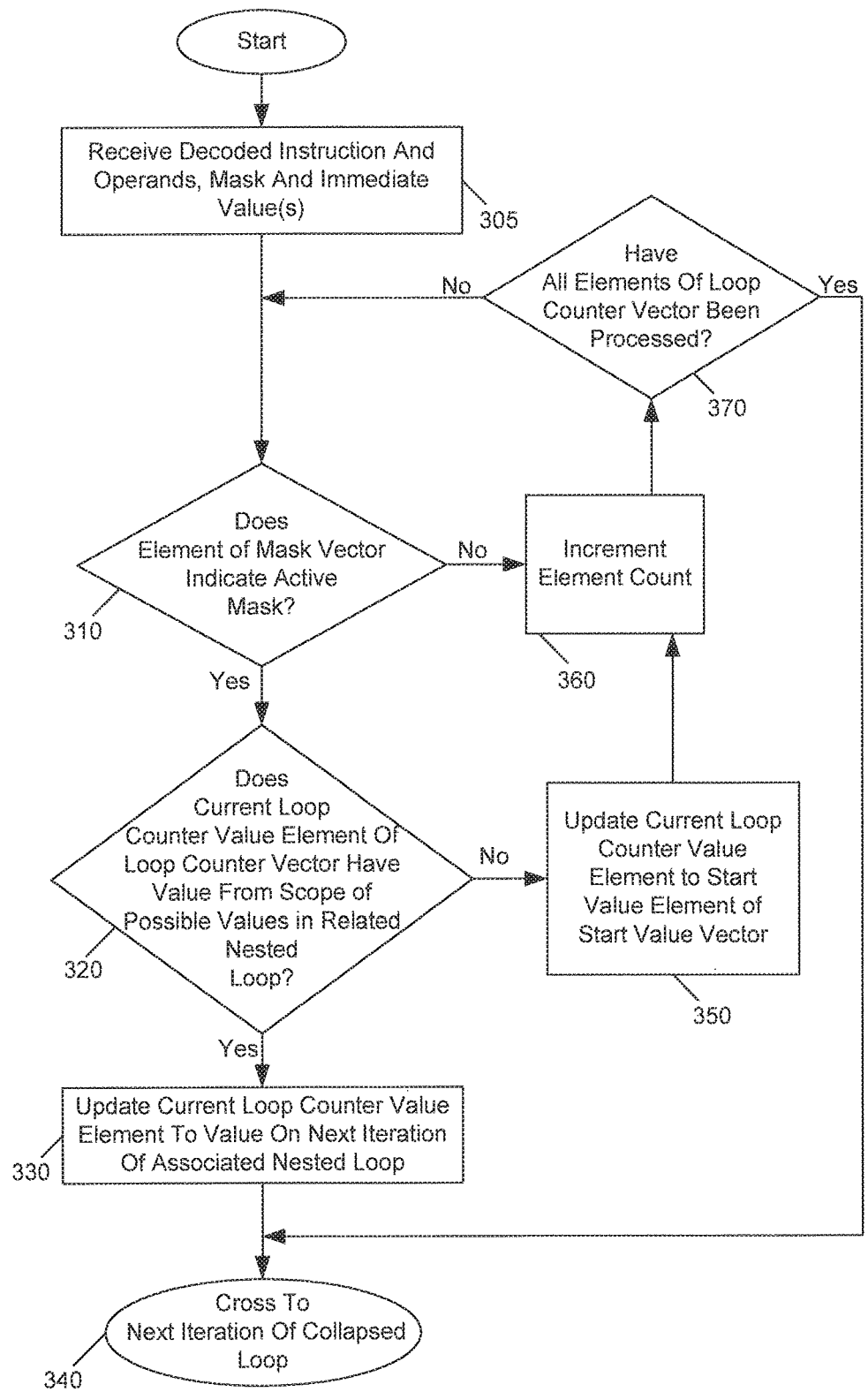
FIG. 4 is a flow diagram of a method in accordance with an embodiment of the present invention.

Referring now to FIG. 4, shown is a flow diagram of a method in accordance with an embodiment of the present invention. More specifically, FIG. 4 shows a method for executing a loop counter update instruction as described herein. In an embodiment, method 300 may be performed by various execution logic of a vector processor such as one or more logic units within a vector execution unit and/or a scalar execution unit of a processor core of a multicore processor. In the embodiment of FIG. 4, method 300 begins by receiving a decoded instruction and operands associated with the instruction (block 305). Optionally, a mask and/or one or more immediate values associated with the instruction also may be received. Next control passes to diamond 310 to determine whether a particular element of a mask vector indicates that the mask is active for this element.

If not, control passes to block 360 where increment of an element count happens. If all elements of the loop counter vector have been processed (determined at diamond 370), then execution comes to block 340, where the update operation may conclude, indicating a crossing to a next iteration of the collapsed loop or completion of the collapsed loop. Otherwise, execution returns back to diamond 310.

If the answer at diamond 310 is yes, control passes to diamond 320 where it can be determined whether a current loop counter value element of a loop counter vector is less than the corresponding end value element of an end value vector. In other words, it is determined whether the loop counter value is not the last one from the scope of possible values in a related nested loop. If it is not the last value, execution comes to block 330, where the current loop counter value element is updated to its value on the next iteration of the related nested loop. In an embodiment in which the loop counter update instruction is an increment instruction, this update may be by incrementing the value, e.g., by 1 according to one flavor of the instruction or by a configurable amount according to a different flavor of the instruction. Control next passes to block 340 where the update operation may conclude, indicating a crossing to a next iteration of the collapsed loop. In an embodiment, a branch operation may occur to thus pass control to a target location.

Still referring to FIG. 4, if instead at diamond 320 it is determined that the given loop counter cannot be updated to the value of the next iteration of related nested loop, control passes to block 350 where the current loop counter value element is updated to a corresponding start value element of a start value vector. Note that if all loop counter values are set to their start value and no update of any loop counter to a value on a next iteration of a related nested loop happened (increment operation), then the collapsed loop, of which this instruction is a part, is completed. From block 350 control passes to block 360 where an element count for this update operation can be incremented and accordingly, the method may proceed through the next nested loop. Although shown at this high level in the embodiment of FIG. 4, understand the scope of the present invention is not limited in this regard.

Figure 5:
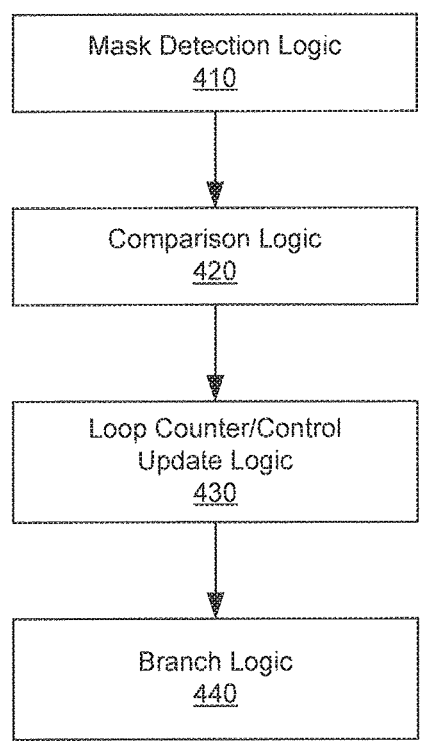
FIG. 5 is a block diagram of a portion of a vector execution unit in accordance with an embodiment of the present invention.

Referring now to FIG. 5, shown is a block diagram of a portion of a vector execution unit in accordance with an embodiment of the present invention. As shown in FIG. 5, vector execution unit 400 includes various logic elements to perform operations on data to thus achieve a desired result. In the implementation shown in FIG. 5, a mask detection logic 410 is coupled to receive incoming values associated with an instruction. In the context of a loop counter update instruction these values may be as described above, namely current values of the loop counters, start and end values for the loop counters and a mask, in one implementation. Mask detection logic 410 thus may determine, for each element of the vector, whether an operation is to be performed or the given element should be masked. If an operation is to be performed, a comparison logic 420 may perform a comparison between a current value of a loop counter element and a given one of a start or end value (for example).

Still referring to FIG. 5, a loop counter/control update logic 430 may, based on a result of the comparison, update a loop counter value element, e.g., by increment or decrement. Still further, one or more control values also may be updated. Finally, a branch logic 440 may cause a branch operation to occur once an update to a loop counter value element has occurred. Of course understand that a vector execution unit may include greater amounts of logic to perform loop counter and other vector instructions.

In an embodiment, a user-level vector instruction can be used to increment multi-dimensional loop counters of a collapsed multi-nested loop. In an embodiment, this instruction is of the form: MDLCINC zmm0{k1},zmm1,zmm2 Here zmm1 is a vector of starting values of the loop counters in each nested loop (istart$_{n-1}$, istart$_{n-2}$, . . . , istart$_0$), zmm2 is a vector of ending values of the loop counters in each nested loop (iend$_{n-1}$, iend$_{n-2}$, . . . iend$_0$), zmm0 is a vector of current values of the loop counters (i$_{n-1}$, i$_{n-2}$, i$_0$) (and into which updates are stored), and k1 is a mask, which chooses a subset of loop counters to increment. Thus the instruction is performed on elements of the vector of current values of the loop counters having a corresponding element of mask k1 of a first value (e.g., a logic 1), and a result, e.g., no increment, an increment, or a starting value is stored into the corresponding element of zmm0.

Pseudo-code of the instruction is as follows in Table 2.

TABLE 2

```
MDLCINC zmm0{k1},zmm1,zmm2 //zmm1 - starting values, zmm2 -
ending for(i=0,inc=1; i<KL; i++)
  if (k1[i] & inc){
    if(zmm0[i]<zmm2[i]) {
      zmm0[i]++
      inc=0
      break
    }else{
      zmm0[i]=zmm1[i]
    }
  }
```

In general, the pseudocode of Table 2 thus operates a for loop in which for values of i less than the number of vector elements (corresponding to KL), a bitwise logical ANDing of an element from the mask and an increment bit value (inc) (initially set at one) is checked. If this bitwise-AND equals 1, a comparison of the corresponding element of the loop counter vector (corresponding to a particular current loop counter value) is compared to the corresponding end value element. If the current loop counter value is less than this end counter value, the current loop counter value is incremented and this increment bit value (inc) is set to zero, which may cause further iterations of the loop to be avoided. Alternately, as shown in Table 2 a branch operation may be performed here to prevent further computations of loop counter values.

If instead the current loop counter value is not less than this end counter value, the starting value for the corresponding element is stored in the current loop counter vector element.

Mask k1 can be used to control which loop counts are incremented. In an example with 3 loop counters, i, j, k, a k1 mask of "101" can be used to only collapse loops over i and k counters. To avoid overwriting one of the sources (i.e., zmm0), an implicit source can be used with the instruction such that starting values of the loop counters are implicitly taken from another vector register, e.g., zmm5. Alternatively, a 4-operand instruction encoding can be used that includes this additional operand reference.

With the loop counter increment instruction provided above, an example 3-nested loop may be as follows in Table 3.

TABLE 3

```
ijk_start[3]={istart, jstart, kstart}      // initialize values outside the loop
ijk_end[3]={iend, jend, kend}
ijk[3]={istart, jstart, kstart}
k5=111b
zmm2{k5}{z}=ijk_start[2:0]   // load data to the registers
  zmm3{k5}{z}=ijk_end[2:0]
  zmm0{k5}{z}=ijk[2:0]
  i_position = 0
  j_position = 1
  k_position = 2
tc_of_collapsed_loop = (iend−istart+1)*(jend−jstart+1)*(kend−kstart+1)
for(n=0; n<tc_of_collapsed_loop; n++){ //collapsed loop
  i=extract(i_position,zmm0) // extract nested loop counters
  from multi-dimensional
                             // loop counter
  j=extract(j_position,zmm0)
  k=extract(k_position,zmm0)
  computation(i,j,k,B[k][j])       // do computations over loop counters,
                                   // including accesses to
                                   // multi-dimensional arrays
  zmm0=mdlcinc(k5,zmm0,zmm2,zmm3) // increment loop counters
}
```

Note that in the above loop, the extract instruction, extract(position,zmm0), is used to return element of vector zmm0 which stands at an offset equal to the position. So, it is simply zmm0[position].

Embodiments thus may avoid overhead of branches inside collapsed loops. One of the purposes of loop collapsing is reducing the total number of branches and branch mispredicts. Using branches related to control which loop counters are to be incremented can eliminate any performance gain from collapsing. Also embodiments avoid overhead of memory references inside the collapsed loop, as all nested loop counters are held in one vector register and can be extracted, e.g., by a single instruction (e.g., a vpcompress instruction) without referencing memory. Still further, the multi-dimensional loop counter vector can be used as is by an instruction for calculating offsets inside a multi-dimensional array. This reduces overhead for accesses to multi-dimensional arrays. Embodiments also may reduce the overall number of instructions used to implement loop collapsing.

In some cases, collapsed loops may have loop counter values that are to be incremented differently by adding a different number to each loop counter. An example of a nested loop with different incrementing loop counter values is seen in Table 4.

TABLE 4

```
for(i_{n−1}=istart_{n−1}; i_{n−1}<= iend_{n−1}; i_{n−1}+= str_{n−1})
  for(i_{n−2}=istart_{n−2}; i_{n−2}<= iend_{n−2}; i_{n−2}+= str_{n−2})
   ...
    for(i_0=istart_0; i_0<= iend_0; i_0+= str_0){
      A[i_{n−1}][i_{n−2}]...[i_0] = Computation((i_{n−1},i_{n−2},...,i0),
      B[i_{k(m−1)}][i_{k(m−2)}]...[i_{k1}][i_{k0}])
    }
```

A 3-operand form of the above increment instruction that provides a so-called stride increment to the loop counter vector is as follows: MDLCINCSTR zmm0{k1},zmm1, zmm2 Here, zmm0 is a vector of current values of loop counters ($i_{n-1}$, $i_{n-2}$, ..., $i_0$), zmm1 is a vector of increment factors (also referred to as stride values) in each dimension ($str_{n-1}$, $str_{n-2}$, ..., $str_0$), zmm2 is a vector of differences between ending and starting values of loop counters in each nested loop ($iend_{n-1}$–$istart_{n-1}$, etc.), and k1 is a mask that chooses a subset of loop counters to increment. Note that from these values a vector of trip counts can be obtained as: (zmm2/zmm1+zmm_ones), where zmm_ones is a vector of ones.

Pseudo-code of this instruction is as follows in Table 5.

TABLE 5

```
MDLCINCSTR zmm0{k1},zmm1,zmm2 //
for(i=0,inc=1; i<KL; i++)
    if (k1[i] & inc){
        if(zmm0[i]<=zmm2[i]-zmm1[i]) {
            zmm0[i]+=zmm1[i]
            inc=0
            break
        }else{
            zmm0[i]=0
        }
    }
```

To obtain the exact values of indexes (loop counters) for further computations, a vector of starting indexes may be added to the result, for example, starting indexes may be added to the resulting loop counter vector as follows (zmm_start=($istart_{n-1}$, $istart_{n-2}$, ..., $istart_0$)). In an embodiment, a vector add instruction may be used: VPADD zmm4,zmm_start,zmm0.

The overhead related to shifting loop counter values to zero base can be eliminated using a 4-operand form of the instruction. This instruction may be of the form: MDLCIN-SCSTR zmm0{k1}, zmm1, zmm2, zmm3, where zmm0=current values, zmm1=strides, zmm2=starting values, and zmm3=ending values, and k1 is a mask. This form is shown in Table 5.1:

TABLE 5.1

```
for(i=0,inc=1; i<KL; i++)
    if (k1[i] & inc){
        if(zmm0[i]<=zmm3[i]-zmm1[i]) {
            zmm0[i]+=zmm1[i]
            inc=0
            break
        }else{
            zmm0[i]=zmm2[j]
        }
    }
```

With 3-operand encoding form provided above, an example of 3-nested loop may be as follows in Table 6.

TABLE 6

```
ijk_start[3]={istart, jstart, kstart}           //initialize values outside the loop
ijk_tc[3]={(iend–istart)/istr+1, (jend–jstart)/jstr+1, (kend–kstart)/kstr+1} //trip counts of
                                                                              // loops
ijk[3]={0, 0, 0}
stride[3]={istr, jstr, kstr} //strides
k5=111b
zmm2{k5}{z}=ijk_tc[2:0]       //load data to the registers
zmm3{k5}{z}=ijk_start[2:0]
zmm1{k5}{z}=stride[2:0]
zmm0{k5}{z}=ijk[2:0]
i_position = 0
j_position = 1
k_position = 2
tc_of_collapsed_loop = ((iend–istart)/istr+1)*((jend–jstart)/jstr+1)*((kend–kstart)/kstr+1)
for(n=0; n<tc_of_collapsed_loop; n++){ //collapsed loop
    zmm4 = zmm3 + zmm0   //add starting values to get correct absolute values for
                          // i,j,k
    i=extract(i_position,zmm4) //extract nested loop counters from multi-dimensional
                                // loop counter
    j=extract(j_position,zmm4)
    k=extract(k_position,zmm4)
    computation(i,j,k,B[k][j])       //do computations over loop counters, including
                                     // accesses to
                                     //multi-dimensional arrays
    zmm0=mdlcincstr(k5,zmm0,zmm1,zmm2)    //increment loop counters
}
```

Collapsing of multi-nested loops also may be aided using an instruction that decrements a multi-dimensional loop counter. An example of a nested loop with decrementing loop counter values is seen in Table 7.

TABLE 7

```
for($i_{n-1}$=$istart_{n-1}$; $i_{n-1}$>= $iend_{n-1}$; $i_{n-1}$--)
    for($i_{n-2}$=$istart_{n-2}$; $i_{n-2}$>= $iend_{n-2}$; $i_{n-2}$--)
        ...
        for($i_0$=$istart_0$; $i_0$>= $iend_0$; $i_0$--){
            A[$i_{n-1}$][$i_{n-2}$]...[$i_0$] = Computation(($i_{n-1}$,$i_{n-2}$,...,$i_0$),
            B[$i_{k(m-1)}$][$i_{k(m-2)}$]...[$i_{k1}$][$i_{k0}$])
        }
```

In an embodiment, this instruction may be of the form: MDLCDEC zmm0{k1},zmm1,zmm2, where zmm1 is a vector of starting values of loop counters ($istart_{n-1}$, $istart_{n-2}$, ..., $istart_0$), zmm2 is a vector of ending values of loop counters ($iend_{n-1}$,$iend_{n-2}$, ..., $iend_0$), zmm0 is a vector of current values of loop counters ($i_{n-1}$, $i_{n-2}$, ..., $i_0$), and k1 is a mask that chooses a subset of loop counters to decrement. The resulting zmm0 vector contains values of loop counters for the next iteration of the collapsed loop. Pseudo-code of this instruction is as follows in Table 8.

TABLE 8

```
for(i=0,inc=1; i<KL; i++)
    if (k1[i] & inc){
        if(zmm0[i]>zmm2[i]) {
            zmm0[i]--
            inc=0
            break
        }else{
            zmm0[i]=zmm1[i]
        }
    }
```

For example, for a 3-times nested scalar loop, this decrement instruction may be used as follows in Table 9.

TABLE 9

```
ijk_start[3]={istart, jstart, kstart}    //initialize values outside the loop
ijk_end[3]={iend, jend, kend}
ijk[3]={istart, jstart, kstart}
k5=111b
zmm2{k5}{z}=ijk_start[2:0]    //load data to the registers
zmm3{k5}{z}=ijk_end[2:0]
zmm0{k5}{z}=ijk[2:0]
i_position = 0
j_position = 1
k_position = 2
tc_of_collapsed_loop = (istart-iend+1)*(jstart-jend+1)*(kstart-kend+1)
for(n=0; n<tc_of_collapsed_loop; n++){    //collapsed loop
    i=extract(i_position,zmm0) //extract nested loop counters
    from multi-dimensional
                                    // loop counter
    j=extract(j_position,zmm0)
    k=extract(k_position,zmm0)
    computation(i,j,k,B[k][j])     //do computations over loop
                                    counters, including
                                    // accesses to multi-dimensional arrays
    zmm0=mdlcdec(k5,zmm0,zmm2,zmm3)    //decrement loop counters
}
```

If only a subset of the loops are to be collapsed, then a different k-mask may be used. In the example above, collapsing loops over i and k can be done with the same vectors zmm0, zmm1, zmm2 by binary mask k1=101.

Obtaining the value of an individual counter (if needed) can be done by vector extraction instructions, e.g., vpextr instruction. In the example above, the j-counter can be extracted by the instruction: vpextr r64, zmm0,1. Here 1 is an offset of j-value inside the multidimensional loop counter zmm0, j value will be in scalar r64 register.

In other examples, a nested loop may have counter values that are decremented according to a variable or stride decrement values. Referring now to Table 10, shown is an example of a nested loop with different decrementing loop counter values.

TABLE 10

```
for(i_{n-1}=istart_{n-1}; i_{n-1}>= iend_{n-1}; i_{n-1} -= str_{n-1})
    for(i_{n-2}=istart_{n-2}; i_{n-2}>= iend_{n-2}; i_{n-2} -= str_{n-2})
        ...
        for(i_0=istart_0; i_0>= iend_0; i_0-= str_0){
            A[i_{n-1}][i_{n-2}]...[i_0] = Computation((i_{n-1},i_{n-2},...,i_0),
            B[i_{k(m-1)}][i_{k(m-2)}]...[i_{k1}][i_{k0}])
        }
```

In an embodiment, a decrement stride instruction to decrement selected data elements by an individually controllable stride amount may be of the form: MDLCDECSTR zmm0{k1},zmm1,zmm2. In this case here zmm0 stores the current loop counter values, zmm1 stores the stride value, and zmm2 stores the differences between starting values and ending values (istart$_j$–iend$_j$).

Pseudocode of this instruction is as in Table 11 below.

TABLE 11

```
for(i=0,inc=1; i<KL; i++)
    if (k1[i] & inc){
        if(zmm0[i]>=zmm1[i]) {
            zmm0[i]-=zmm1[i]
            inc=0
        }else{
            zmm0[i]=zmm2[i]
        }
    }
```

A 4-operand form of this instruction is as follows and shown in Table 11.1.

TABLE 11.1

```
for(i=0,inc=1; i<KL; i++)
    if (k1[i] & inc){
        if(zmm0[i]>=zmm2[j]+zmm1[i]) {
            zmm0[i]-=zmm1[i]
            inc=0
            break
        }else{
            zmm0[i]=zmm3[i]
        }
    }
```

An example collapsed loop for a 3-nested loop using this decrement stride instruction may be as follows in Table 12.

TABLE 12

```
ijk_end[3]={iend, jend, kend}          //initialize values outside the loop
ijk_tc[3]={(istart-iend)/istr+1, (jstart-jend)/jstr+1, (kstart-kend)/kstr+1} //trip counts of
                                                                              // loops
ijk[3]={istart, jstart, kstart}
stride[3]={istr, jstr, kstr}   //strides
k5=111b
zmm2{k5}{z}=ijk_tc[2:0]    //load data to the registers
zmm3{k5}{z}=ijk_end[2:0]
zmm1{k5}{z}=stride[2:0]
zmm0{k5}{z}=ijk[2:0]
i_position = 0
j_position = 1
k_position = 2
tc_of_collapsed_loop = ((istart-iend)/istr+1)*((jstart-jend)/jstr+1)*((kstart-kend)/kstr+1)
for(n=0; n<tc_of_collapsed_loop; n++){   //collapsed loop
    zmm4 = zmm3 + zmm0    //add ending values to get correct absolute values for
                                    // i,j,k
    i=extract(i_position,zmm4) //extract nested loop counters from multi-dimensional
                                    // loop counter
```

TABLE 12-continued

```
      j=extract(j_position,zmm4)
      k=extract(k_position,zmm4)
      computation(i,j,k,B[k][j])       //do computations over loop counters, including
                                       // accesses to
                                       //multi-dimensional arrays
      zmm0=mdlcdecstr(k5,zmm0,zmm1,zmm2)   //decrement loop counters
}
```

More generally in some embodiments an instruction may provide for individual increment or decrement control of loop counter values of a loop counter value vector (both of controllable factors). In this way the different counts of a collapsed loop may be incremented or decremented individually by adding a different number to each. In particular, not all loops need be incremented or decremented, and instead some of the loops may be decremented while others are incremented. The case of all the loops incrementing or decrementing in a uniform way may occur using other flavors of a multi-dimensional loop counter control instruction, as described above.

Using such an instruction, some loops can have an increment and other loops can have a decrement without using separate instructions to handle each group, which would involve appropriate mask preparation to isolate the loops that will increment and the ones that will decrement.

This generalized increment/decrement instruction may be useful in situations as in Table 13, where some loops are incremented and some loops are decremented.

TABLE 13

```
for(i_{n-1}=istart_{n-1}; i_{n-1}<= iend_{n-1}; i_{n-1}++) //some loops are incremented
   for(i_{n-2}=istart_{n-2}; i_{n-2}>= iend_{n-2}; i_{n-2}--) //and some are decremented
   ...
      for(i_0=istart_0; i_0<= iend_0; i_0++){
         A[i_{n-1}][i_{n-2}]...[i_0] = Computation((i_{n-1},i_{n-2},...,i_0),
         B[i_{k(m-1)}][i_{k(m-2)}]...[i_{k1}][i_{k0}])
      }
```

In an embodiment, this generalized instruction to provide either increment or decrement of selected loop counters may be of the form MDLCINCDEC zmm0{k1},zmm1,zmm2, imm, where zmm0 is the current values for the loop counter vector, zmm1 includes starting values, zmm2 includes ending values, imm is an immediate operand of n-bits (n—number of nested loops) showing which loops are incremented (imm[i]=1) or decremented (imm[i]=0). Pseudocode for this instruction is as follows in Table 14.

TABLE 14

```
for(i=0,inc=1; i<KL; i++)
   if (k1[i] & inc){
      if (imm[i]){
         if(zmm0[i]<zmm2[i]) {
            zmm0[i]++
            inc=0
            break
         }else{
            zmm0[i]=zmm1[i]
         }
      else{
         if(zmm0[i]>zmm2[i]) {
            zmm0[i]--
            inc=0
            break
         }else{
            zmm0[i]=zmm1[i]
         }
      }
   }
```

For the 3-nested loop of Table 15 below, this generalized increment/decrement instruction may be used.

TABLE 15

```
for(i=istart; i>=iend; i--)
   for(j=jstart; j<=jend; j++)
      for(k=kstart; k<=iend; k++){
         computation(i,j,k, B[j][k]);
      }
```

Collapsed loop has again the same form:

```
ijk_start[3]={istart, jstart, kstart}      //initialize values outside the loop
ijk_end[3]={iend, jend, kend}
ijk[3]={istart, jstart, kstart}
k5=111b
zmm2{k5}{z}=ijk_start[2:0]    //load data to the registers
zmm3{k5}{z}=ijk_end[2:0]
zmm0{k5}{z}=ijk[2:0]
imm = 110b   //i-loop counter is decremented, j & k-loop counters are incremented
i_position = 0
j_position = 1
k_position = 2
tc_i_loop = (istart-iend)*(-1)*(2*imm[i_position]-1)+1   //(-1)*(2*imm[i_position]-1) is
                                                          // equal to "-1" for incremented
                                                          // loops and "1" for decremented
tc_j_loop = (jstart-jend)*(-1)*(2*imm[j_position]-1)+1   //this is needed to automate
                                                          // calculation of trip counts
tc_k_loop = (kstart-kend)*(-1)*(2*imm[k_position]-1)+1
tc_of_collapsed_loop = tc_i_loop*tc_j_loop*tc_k_loop
for(n=0; n<tc_of_collapsed_loop; n++){   //collapsed loop
   i=extract(i_position,zmm0)   //extract nested loop counters from multi-dimensional
                                //loop counter
```

```
    j=extract(j_position,zmm0)
    k=extract(k_position,zmm0)
    computation(i,j,k,B[k][j])         //do computations over loop counters, including
                                       //accesses to
                                       //multi-dimensional arrays
    zmm0=mdlcincdec(k5,zmm0,zmm2,zmm3,imm)  //increment/decrement loop counters
}
```

Note that the increment/decrement control can be encoded in different ways. For example, an 8-bit immediate can be used, which will limit the number of loops to increment or decrement to 8. This is reasonable since it is rare to have more than 8 loops nested. Alternatively, a third operand can encode this control, or it can be done using a mask or a general purpose register (GPR). It can also be encoded as an implicit source (e.g., RAX).

Alternative implementations to avoid overwriting zmm0 (vector of current values) include encoding a third source (becoming a 4 operand instruction) or assuming an implicit source, e.g., increment counts implicitly in ZMM5.

In other implementations, stride generalized increment/decrement instructions may be provided such that some loops are incremented and some loops are decremented by controllable amounts. Such situations may occur in the following code of Table 16.

TABLE 16

```
for(i_{n-1}=istart_{n-1}; i_{n-1}<= iend_{n-1}; i_{n-1}+=str_{n-1})  //some loops are
                                                           // incremented
    for(i_{n-2}=istart_{n-2}; i_{n-2}>= iend_{n-2}; i_{n-2}-=str_{n-2})  //and
    some are decremented
    ...
        for(i_0=istart_0; i_0<= iend_0; i_0+=str_0){
            A[i_{n-1}][i_{n-2}]...[i_0] = Computation((i_{n-1},i_{n-2},...,i_0),
            B[i_{k(m-1)}][i_{k(m-2)}]...[i_{k1}][i_{k0}])
        }
```

In an embodiment, this generalized instruction to provide either incrementing or decrementing of a selected amount to selected data elements may be of the form: MDLCINCDEC-STR zmm0{k1},zmm1,zmm2,imm, where zmm0 provides the current loop counter values, zmm1 are strides values, zmm2 are values of differences between end and start values, imm is an immediate operand of n-bits (n—number of nested loops) showing which loops are incremented (imm[i]=1) or decremented (imm[i]=0). Pseudocode for this instruction is as follows in Table 17.

TABLE 17

```
for(i=0,inc=1; i<KL; i++)
    if (k1[i] & inc){
        if (imm[i]){
            if(zmm0[i]<=zmm2[i]-zmm1[i]) {
                zmm0[i]+=zmm1[i]
                inc=0
                break
            }else{
                zmm0[i]=0
            }
        }
        else{
            if(zmm0[i]>=zmm1[i]) {
                zmm0[i]-=zmm1[i]
                inc=0
                break
            }else{
                zmm0[i]=zmm2[i]
            }
        }
    }
```

The following nested loop of Table 18 can be converted into collapsed form using one or more instructions in accordance with an embodiment of the present invention.

TABLE 18

```
for(i=istart; i>=iend; i-=istr)
    for(j=jstart; j<=jend; j+=jstr)
        for(k=kstart; k<=iend; k+=kstr){
            computation(i,j,k, B[j][k]);
        }
```

Collapsed loop has again the same form:

```
ijk_start[3]={istart, jstart, kstart}    //initialize values outside the loop
ijk_end[3]={iend, jend, kend}
ijk[3]={istart, jstart, kstart}
k5=111b
zmm2{k5}{z}=ijk_start[2:0]    //load data to the registers
zmm3{k5}{z}=ijk_end[2:0]
zmm3 = min(zmm2,zmm3) //here we define offset of loop counters - it is either istart
                     //for incremented loops or iend for decremented ones
zmm0{k5}{z}=ijk[2:0]
imm = 110b   //i-loop counter is decremented, j & k-loop counters are incremented
i_position = 0
j_position = 1
k_position = 2
tc_i_loop = (istart-iend)*(-1)*(2*imm[i_position]-1)+1  //(-1)*(2*imm[i_position]-1) is
                                                        //equal to "-1" for incremented loops and "1"
                                                        //for decremented
tc_j_loop = (jstart-jend)*(-1)*(2*imm[j_position]-1)+1  //this is needed to automate
                                                        //calculation of trip counts
tc_k_loop = (kstart-kend)*(-1)*(2*imm[k_position]-1)+1
tc_of_collapsed_loop = tc_i_loop*tc_j_loop*tc_k_loop
```

```
for(n=0; n<tc_of_collapsed_loop; n++){   //collapsed loop
    zmm4 = zmm3 + zmm0   //add offset values to get correct absolute values for i,j,k
    i=extract(i_position,zmm4) //extract nested loop counters from multi-dimensional
                               //loop counter
    j=extract(j_position,zmm4)
    k=extract(k_position,zmm4)
    computation(i,j,k,B[k][j])   //do computations over loop counters, including
                                 // accesses to
                                 //multi-dimensional arrays
    zmm0=mdlcincdecstr(k5,zmm0,zmm2,zmm3,imm) //increment/decrement loop counters
}
```

Embodiments provide a method of collapsing multi-nested loops by using a multi-dimensional loop counter and increment instructions. In one embodiment computation of trip counts of the collapsed loop may be provided, the loop counter values extracted for use in computation, and then an increment instruction, as described herein occurs, as seen in Table 19.

TABLE 19

```
tc_of_collapsed_loop = (iend-istart+1)*(jend-jstart+1)*(kend-kstart+1)
for(n=0; n<tc_of_collapsed_loop; n++){  //collapsed loop
    i=extract(i_position,zmm0)     //extract nested loop counters from
                                   //multidimensional loop counter
    j=extract(j_position,zmm0)
    k=extract(k_position,zmm0)
    computation(i,j,k,B[k][j])     //do computations over
                                   loop counters, including
                                   //accesses to
                                   multidimensional arrays
    zmm0=MDLCINC(k5,zmm0,zmm2,zmm3) //increment multi-
                                    dimensional loop
                                    //counter
}
```

In yet another embodiment, the loop counter instruction may be used in connection with an update to one or more flags of a status register such as a flag register. For example an update to a zero flag (ZF) or a carry flag (CF) of a flag register of a processor may occur as follows: if (inc==0) ZF=1; if (inc==1) CF=1. This is applicable to all types of increment instructions. If (inc==0) then it means an increment has been done and the loop has crossed to next iteration of collapsed loop successfully. If (inc==1), that means all loop counters have been updated to starting values, but no increment is done, in other words the collapsed loop is over. Such control can be used for control of collapsed loop end. Increment instructions with a flag modification can be used to collapse loops, as seen in Table 20.

TABLE 20

```
do{ //collapsed loop
    i=extract(i_position,zmm0)    //extract nested loop counters from
                                  //multidimensional loop counter
    j=extract(j_position,zmm0)
    k=extract(k_position,zmm0)
    computation(i,j,k,B[k][j])    //do computations over loop
                                  counters, including
                                  // accesses to
                                  multidimensional arrays
    zmm0=MDLCINCFLAG(k5,zmm0,zmm2,zmm3) //increment multi-
                                        dimensional
                                        //loop counter with
                                        flag modification
```

TABLE 20-continued

```
}while(ZF==1)   //repeat while there anything left to increment.
                Also possible
                //do{ }until(CF==1) - repeat until
                increment will not happen
```

As an example of flag modification operation, if there is a loop:
for(k=1;k<=3;k++)
 for(j=1;j<=3;j++)
  for(i=1;i<=3;i++)
and already the loop counter vector (mdlc) is equal to 3:3:3, then after increment MDLCINCFLAG(mdlc) a result mdlc=1:1:1 occurs and CF==1 (ZF==1).

The instruction variations described herein may be used together with an instruction to calculate offsets in multi-dimensional arrays. Use of such combinations may avoid compression/extraction instructions for obtaining each individual counter values to access an array. Instead this offset calculation instruction uses the vector of current loop counters to compute the offset from a starting address of the array.

Exemplary Instruction Formats

Embodiments of the instruction(s) described herein may be embodied in different formats. For example, the instruction(s) described herein may be embodied as a VEX, generic vector friendly, or other format. Details of VEX and a generic vector friendly format are discussed below. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 6A illustrates an exemplary AVX instruction format including a VEX prefix 602, real opcode field 630, Mod R/M byte 640, SIB byte 650, displacement field 662, and IMM8 672. FIG. 6B illustrates which fields from FIG. 6A make up a full opcode field 674 and a base operation field 642. FIG. 6C illustrates which fields from FIG. 6A make up a register index field 644.

VEX Prefix (Bytes 0-2) 602 is encoded in a three-byte form. The first byte is the Format Field 640 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 605 (VEX Byte 1, bits [7-5]) consists of a VEX.R bit field (VEX Byte 1, bit [7]—R), VEX.X bit field (VEX byte 1, bit [6]—X), and VEX.B bit field (VEX byte 1, bit[5]—B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 615 (VEX byte 1, bits [4:0]—mmmmm) includes content to encode an implied leading opcode byte. W Field 664 (VEX byte 2, bit [7]—W)—is represented by the notation VEX.W, and provides different functions depending on the instruction. The role of VEX.vvvv 620 (VEX Byte 2, bits [6:3]—vvvv) may include the following: 1) VEX.vvvv encodes the first source register operand, specified in inverted (1 s complement) form and is valid for instructions with 2 or more source operands; 2) VEX.vvvv encodes the destination register operand, specified in is complement form for certain vector shifts; or 3) VEX.vvvv does not encode any operand, the field is reserved and should contain 1111b. If VEX.L 668 Size field (VEX byte 2, bit [2]—L)=0, it indicates 128 bit vector; if VEX.L=1, it indicates 256 bit vector. Prefix encoding field 625 (VEX byte 2, bits [1:0]—pp) provides additional bits for the base operation field.

Real Opcode Field 630 (Byte 3) is also known as the opcode byte. Part of the opcode is specified in this field.

MOD R/M Field 640 (Byte 4) includes MOD field 642 (bits [7-6]), Reg field 644 (bits [5-3]), and R/M field 646 (bits [2-0]). The role of Reg field 644 may include the following: encoding either the destination register operand or a source register operand (the rrr of Rrrr), or be treated as an opcode extension and not used to encode any instruction operand. The role of R/M field 646 may include the following: encoding the instruction operand that references a memory address, or encoding either the destination register operand or a source register operand.

Scale, Index, Base (SIB)—The content of Scale field 650 (Byte 5) includes SS652 (bits [7-6]), which is used for memory address generation. The contents of SIB.xxx 654 (bits [5-3]) and SIB.bbb 656 (bits [2-0]) have been previously referred to with regard to the register indexes Xxxx and Bbbb.

The Displacement Field 662 and the immediate field (IMM8) 672 contain address data.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 7A:
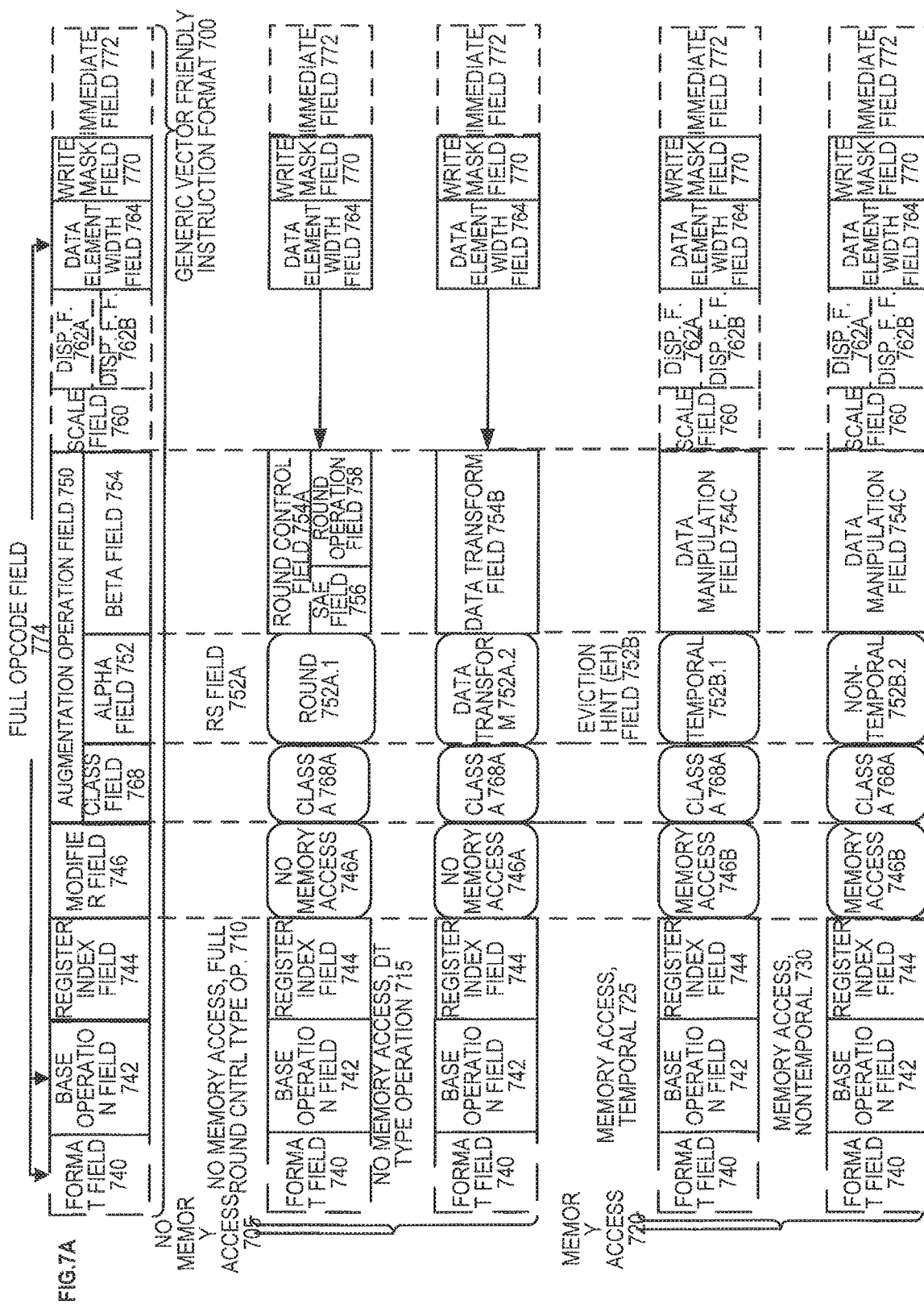

FIGS. 7A-7B are block diagrams illustrating a generic vector friendly instruction format and instruction templates thereof according to embodiments of the invention. FIG. 7A is a block diagram illustrating a generic vector friendly instruction format and class A instruction templates thereof according to embodiments of the invention; while FIG. 7B is a block diagram illustrating the generic vector friendly instruction format and class B instruction templates thereof according to embodiments of the invention. Specifically, a generic vector friendly instruction format 700 for which are defined class A and class B instruction templates, both of which include no memory access 705 instruction templates and memory access 720 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 7A include: 1) within the no memory access 705 instruction templates there is shown a no memory access, full round control type operation 710 instruction template and a no memory access, data transform type operation 715 instruction template; and 2) within the memory access 720 instruction templates there is shown a memory access, temporal 725 instruction template and a memory access, non-temporal 730 instruction template. The class B instruction templates in FIG. 7B include: 1) within the no memory access 705 instruction templates there is shown a no memory access, write mask control, partial round control type operation 712 instruction template and a no memory access, write mask control, vsize type operation 717 instruction template; and 2) within the memory access 720 instruction templates there is shown a memory access, write mask control 727 instruction template.

The generic vector friendly instruction format 700 includes the following fields listed below in the order illustrated in FIGS. 7A-7B. In conjunction with the discussions above, in an embodiment, referring to the format details provided below in FIGS. 7A-B and 8, either a non memory access instruction type 705 or a memory access instruction type 720 may be utilized. Addresses for the input vector operand(s) and destination may be identified in register address field 744 described below. The optional embodiment discussed above also includes a scalar input which may also be specified in address field 744.

Format field 740—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 742—its content distinguishes different base operations.

Register index field 744—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 746—its content distinguishes occurrences of instructions in the generic vector instruction format that specify memory access from those that do not; that is, between no memory access 705 instruction templates and memory access 720 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 750—its content distinguishes which one of a variety of different operations to be performed in addition to the base operation. This field is context specific. In one embodiment of the invention, this field is divided into a class field 768, an alpha field 752, and a beta field 754. The augmentation operation field 750 allows common groups of operations to be performed in a single instruction rather than 2, 3, or 4 instructions.

Scale field 760—its content allows for the scaling of the index field's content for memory address generation (e.g., for address generation that uses 2 scale*index+base).

Displacement Field 762A—its content is used as part of memory address generation (e.g., for address generation that uses 2 scale*index+base+displacement).

Displacement Factor Field 762B (note that the juxtaposition of displacement field 762A directly over displacement factor field 762B indicates one or the other is used)—its content is used as part of address generation; it specifies a displacement factor that is to be scaled by the size of a memory access (N)—where N is the number of bytes in the memory access (e.g., for address generation that uses 2 scale*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 774 (described later herein) and the data manipulation field 754C. The displacement field 762A and the displacement factor field 762B are optional in the sense that they are not used for the no memory access 705 instruction templates and/or different embodiments may implement only one or none of the two.

Data element width field 764—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 770—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 770 allows for partial vector operations, including loads, stores, arithmetic, logical, etc. While embodiments of the invention are described in which the write mask field's 770 content selects one of a number of write mask registers that contains the write mask to be used (and thus the write mask field's 770 content indirectly identifies that masking to be performed), alternative embodiments instead or additional allow the mask write field's 770 content to directly specify the masking to be performed.

Immediate field 772—its content allows for the specification of an immediate. This field is optional in the sense that is it not present in an implementation of the generic vector friendly format that does not support immediate and it is not present in instructions that do not use an immediate.

Class field 768—its content distinguishes between different classes of instructions. With reference to FIGS. 7A-B, the contents of this field select between class A and class B instructions. In FIGS. 7A-B, rounded corner squares are used to indicate a specific value is present in a field (e.g., class A 768A and class B 768B for the class field 768 respectively in FIGS. 7A-B).

Instruction Templates of Class A

In the case of the non-memory access 705 instruction templates of class A, the alpha field 752 is interpreted as an RS field 752A, whose content distinguishes which one of the different augmentation operation types are to be performed (e.g., round 752A.1 and data transform 752A.2 are respectively specified for the no memory access, round type operation 710 and the no memory access, data transform type operation 715 instruction templates), while the beta field 754 distinguishes which of the operations of the specified type is to be performed. In the no memory access 705 instruction templates, the scale field 760, the displacement field 762A, and the displacement scale filed 762B are not present.

No-Memory Access Instruction Templates—Full Round Control Type Operation

In the no memory access full round control type operation 710 instruction template, the beta field 754 is interpreted as a round control field 754A, whose content(s) provide static rounding. While in the described embodiments of the invention the round control field 754A includes a suppress all floating point exceptions (SAE) field 756 and a round operation control field 758, alternative embodiments may support may encode both these concepts into the same field or only have one or the other of these concepts/fields (e.g., may have only the round operation control field 758).

SAE field 756—its content distinguishes whether or not to disable the exception event reporting; when the SAE field's 756 content indicates suppression is enabled, a given instruction does not report any kind of floating-point exception flag and does not raise any floating point exception handler.

Round operation control field 758—its content distinguishes which one of a group of rounding operations to perform (e.g., Round-up, Round-down, Round-towards-zero and Round-to-nearest). Thus, the round operation control field 758 allows for the changing of the rounding mode on a per instruction basis. In one embodiment of the invention where a processor includes a control register for specifying rounding modes, the round operation control field's 750 content overrides that register value.

No Memory Access Instruction Templates—Data Transform Type Operation

In the no memory access data transform type operation 715 instruction template, the beta field 754 is interpreted as a data transform field 754B, whose content distinguishes which one of a number of data transforms is to be performed (e.g., no data transform, swizzle, broadcast).

In the case of a memory access 720 instruction template of class A, the alpha field 752 is interpreted as an eviction hint field 752B, whose content distinguishes which one of the eviction hints is to be used (in FIG. 7A, temporal 752B.1 and non-temporal 752B.2 are respectively specified for the memory access, temporal 725 instruction template and the memory access, non-temporal 730 instruction template), while the beta field 754 is interpreted as a data manipulation field 754C, whose content distinguishes which one of a number of data manipulation operations (also known as primitives) is to be performed (e.g., no manipulation; broadcast; up conversion of a source; and down conversion of a destination). The memory access 720 instruction templates include the scale field 760, and optionally the displacement field 762A or the displacement scale field 762B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 752 is interpreted as a write mask control (Z) field 752C, whose content distinguishes whether the write masking controlled by the write mask field 770 should be a merging or a zeroing.

In the case of the non-memory access 705 instruction templates of class B, part of the beta field 754 is interpreted as an RL field 757A, whose content distinguishes which one of the different augmentation operation types are to be performed (e.g., round 757A.1 and vector length (VSIZE) 757A.2 are respectively specified for the no memory access, write mask control, partial round control type operation 712 instruction template and the no memory access, write mask control, VSIZE type operation 717 instruction template), while the rest of the beta field 754 distinguishes which of the operations of the specified type is to be performed. In the no memory access 705 instruction templates, the scale field 760, the displacement field 762A, and the displacement scale filed 762B are not present.

In the no memory access, write mask control, partial round control type operation 710 instruction template, the rest of the beta field 754 is interpreted as a round operation field 759A and exception event reporting is disabled (a given instruction does not report any kind of floating-point exception flag and does not raise any floating point exception handler).

Round operation control field 759A—just as round operation control field 758, its content distinguishes which one of a group of rounding operations to perform (e.g., Round-up, Round-down, Round-towards-zero and Round-to-nearest). Thus, the round operation control field 759A allows for the changing of the rounding mode on a per instruction basis. In one embodiment of the invention where a processor includes a control register for specifying rounding modes, the round operation control field's 750 content overrides that register value.

In the no memory access, write mask control, VSIZE type operation 717 instruction template, the rest of the beta field 754 is interpreted as a vector length field 759B, whose content distinguishes which one of a number of data vector lengths is to be performed on (e.g., 128, 256, or 512 byte).

In the case of a memory access 720 instruction template of class B, part of the beta field 754 is interpreted as a broadcast field 757B, whose content distinguishes whether or not the broadcast type data manipulation operation is to be performed, while the rest of the beta field 754 is interpreted the vector length field 759B. The memory access 720 instruction templates include the scale field 760, and optionally the displacement field 762A or the displacement scale field 762B.

With regard to the generic vector friendly instruction format 700, a full opcode field 774 is shown including the format field 740, the base operation field 742, and the data element width field 764. While one embodiment is shown where the full opcode field 774 includes all of these fields, the full opcode field 774 includes less than all of these fields in embodiments that do not support all of them. The full opcode field 774 provides the operation code (opcode).

The augmentation operation field 750, the data element width field 764, and the write mask field 770 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 8A is a block diagram illustrating an exemplary specific vector friendly instruction format according to embodiments of the invention. FIG. 8A shows a specific vector friendly instruction format 800 that is specific in the sense that it specifies the location, size, interpretation, and order of the fields, as well as values for some of those fields. The specific vector friendly instruction format 800 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 7 into which the fields from FIG. 8A map are illustrated.

It should be understood that, although embodiments of the invention are described with reference to the specific vector friendly instruction format 800 in the context of the generic vector friendly instruction format 700 for illustrative purposes, the invention is not limited to the specific vector friendly instruction format 800 except where claimed. For example, the generic vector friendly instruction format 700 contemplates a variety of possible sizes for the various fields, while the specific vector friendly instruction format 800 is shown as having fields of specific sizes. By way of specific example, while the data element width field 764 is illustrated as a one bit field in the specific vector friendly instruction format 800, the invention is not so limited (that is, the generic vector friendly instruction format 700 contemplates other sizes of the data element width field 764).

The generic vector friendly instruction format 700 includes the following fields listed below in the order illustrated in FIG. 8A.

EVEX Prefix (Bytes 0-3) 802—is encoded in a four-byte form.

Format Field 740 (EVEX Byte 0, bits [7:0])—the first byte (EVEX Byte 0) is the format field 740 and it contains 0x62 (the unique value used for distinguishing the vector friendly instruction format in one embodiment of the invention).

The second-fourth bytes (EVEX Bytes 1-3) include a number of bit fields providing specific capability.

REX field 805 (EVEX Byte 1, bits [7-5])—consists of a EVEX.R bit field (EVEX Byte 1, bit [7]—R), EVEX.X bit field (EVEX byte 1, bit [6]—X), and 757BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 710—this is the first part of the REX' field 710 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 815 (EVEX byte 1, bits [3:0]—mmmm)—its content encodes an implied leading opcode byte (0F, 0F 38, or 0F 3).

Data element width field 764 (EVEX byte 2, bit [7]—W)—is represented by the notation EVEX.W. EVEX.W is used to define the granularity (size) of the datatype (either 32-bit data elements or 64-bit data elements).

EVEX.vvvv 820 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 820 encodes the 4 low-order bits of the first source register specifier stored in inverted (1s complement) form. Depending on the instruction, an extra different EVEX bit field is used to extend the specifier size to 32 registers.

EVEX.U 768 Class field (EVEX byte 2, bit [2]—U)—If EVEX.U=0, it indicates class A or EVEX.U0; if EVEX.U=1, it indicates class B or EVEX.U1.

Prefix encoding field 825 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 752 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 754 (EVEX byte 3, bits [6:4]—SSS, also known as EVEX.s2-0, EVEX.r2-0, EVEX.rr1, EVEX.LL0, EVEX.LLB; also illustrated with βββ)—as previously described, this field is context specific.

REX' field 710—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 770 (EVEX byte 3, bits [2:0]—kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 830 (Byte 4) is also known as the opcode byte. Part of the opcode is specified in this field.

MOD R/M Field 840 (Byte 5) includes MOD field 842, Reg field 844, and R/M field 846. As previously described, the MOD field's 842 content distinguishes between memory access and non-memory access operations. The role of Reg field 844 can be summarized to two situations: encoding either the destination register operand or a source register operand, or be treated as an opcode extension and not used to encode any instruction operand. The role of R/M field 846 may include the following: encoding the instruction operand that references a memory address, or encoding either the destination register operand or a source register operand.

Scale, Index, Base (SIB) Byte (Byte 6)—As previously described, the scale field's 750 content is used for memory address generation. SIB.xxx 854 and SIB.bbb 856—the contents of these fields have been previously referred to with regard to the register indexes Xxxx and Bbbb.

Displacement field 762A (Bytes 7-10)—when MOD field 842 contains 10, bytes 7-10 are the displacement field 762A, and it works the same as the legacy 32-bit displacement (disp32) and works at byte granularity.

Displacement factor field 762B (Byte 7)—when MOD field 842 contains 01, byte 7 is the displacement factor field 762B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 762B is a reinterpretation of disp8; when using displacement factor field 762B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 762B substitutes the legacy x86 instruction set 8-bit displacement. Thus, the displacement factor field 762B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 772 operates as previously described.

Full Opcode Field

FIG. 8B is a block diagram illustrating the fields of the specific vector friendly instruction format 800 that make up the full opcode field 774 according to one embodiment of the invention. Specifically, the full opcode field 774 includes the format field 740, the base operation field 742, and the data element width (W) field 764. The base operation field 742 includes the prefix encoding field 825, the opcode map field 815, and the real opcode field 830.

Register Index Field

FIG. 8C is a block diagram illustrating the fields of the specific vector friendly instruction format 800 that make up the register index field 744 according to one embodiment of the invention. Specifically, the register index field 744 includes the REX field 805, the REX' field 810, the MODR/M.reg field 844, the MODR/M.r/m field 846, the VVVV field 820, xxx field 854, and the bbb field 856.

Augmentation Operation Field

Figure 8D:
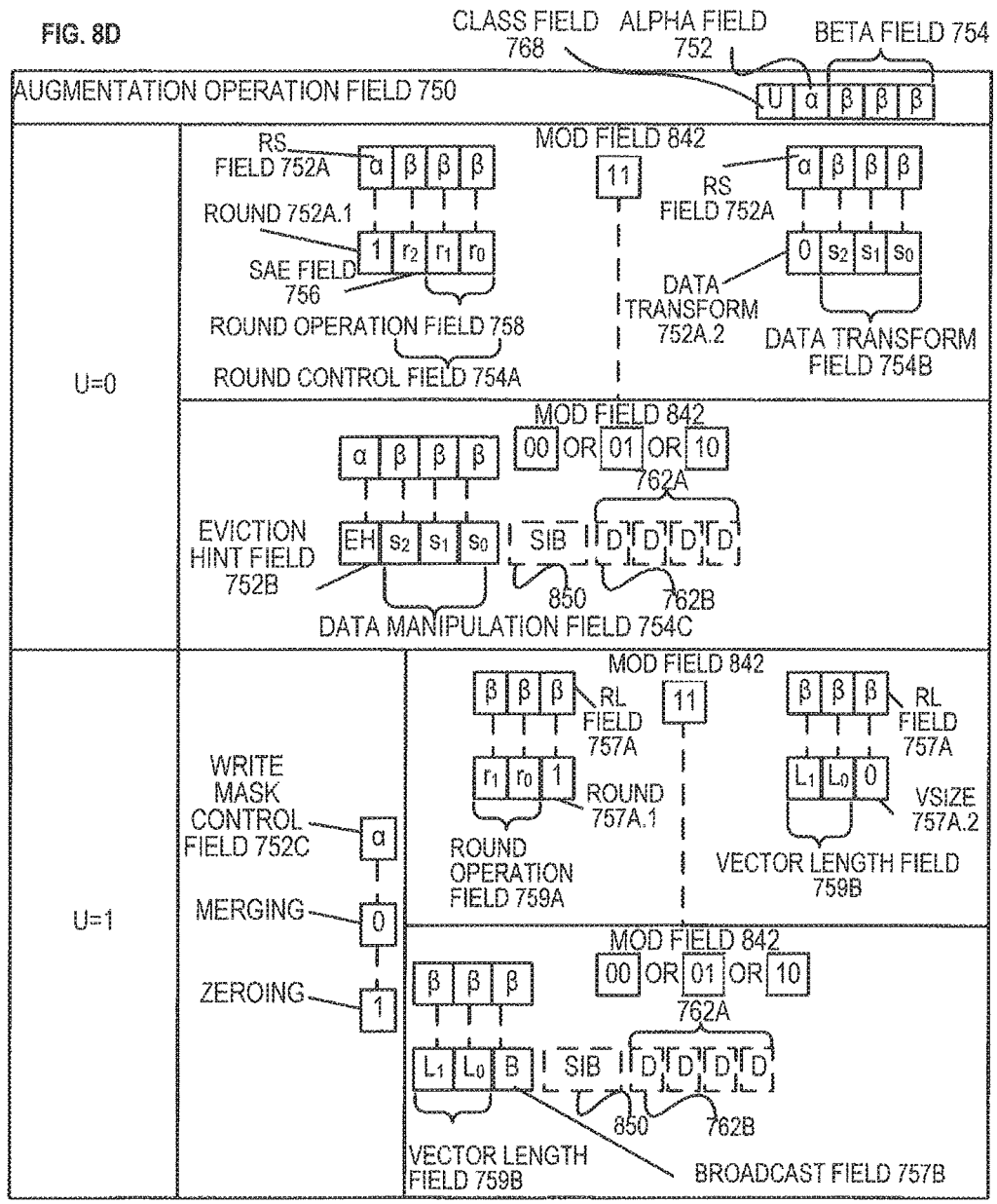
FIG. 8D is a block diagram illustrating the fields of the specific vector friendly instruction format according to embodiments of the invention.

FIG. 8D is a block diagram illustrating the fields of the specific vector friendly instruction format 800 that make up the augmentation operation field 750 according to one embodiment of the invention. When the class (U) field 768 contains 0, it signifies EVEX.U0 (class A 768A); when it contains 1, it signifies EVEX.U1 (class B 768B). When U=0 and the MOD field 842 contains 11 (signifying a no memory access operation), the alpha field 752 (EVEX byte 3, bit [7]—EH) is interpreted as the rs field 752A. When the rs field 752A contains a 1 (round 752A.1), the beta field 754 (EVEX byte 3, bits [6:4]—SSS) is interpreted as the round control field 754A. The round control field 754A includes a one bit SAE field 756 and a two bit round operation field 758. When the rs field 752A contains a 0 (data transform 752A.2), the beta field 754 (EVEX byte 3, bits [6:4]—SSS) is interpreted as a three bit data transform field 754B. When U=0 and the MOD field 842 contains 00, 01, or 10 (signifying a memory access operation), the alpha field 752 (EVEX byte 3, bit [7]—EH) is interpreted as the eviction hint (EH) field 752B and the beta field 754 (EVEX byte 3, bits [6:4]—SSS) is interpreted as a three bit data manipulation field 754C.

When U=1, the alpha field 752 (EVEX byte 3, bit [7]—EH) is interpreted as the write mask control (Z) field 752C. When U=1 and the MOD field 842 contains 11 (signifying a no memory access operation), part of the beta field 754 (EVEX byte 3, bit [4]—S0) is interpreted as the RL field 757A; when it contains a 1 (round 757A.1) the rest of the beta field 754 (EVEX byte 3, bit [6-5]—S2-1) is interpreted as the round operation field 759A, while when the RL field 757A contains a 0 (VSIZE 757.A2) the rest of the beta field 754 (EVEX byte 3, bit [6-5]—S2-1) is interpreted as the vector length field 759B (EVEX byte 3, bit [6-5]—L1-0). When U=1 and the MOD field 842 contains 00, 01, or 10 (signifying a memory access operation), the beta field 754 (EVEX byte 3, bits [6:4]—SSS) is interpreted as the vector length field 759B (EVEX byte 3, bit [6-5]—L1-0) and the broadcast field 757B (EVEX byte 3, bit [4]—B).

Exemplary Register Architecture

Figure 9:
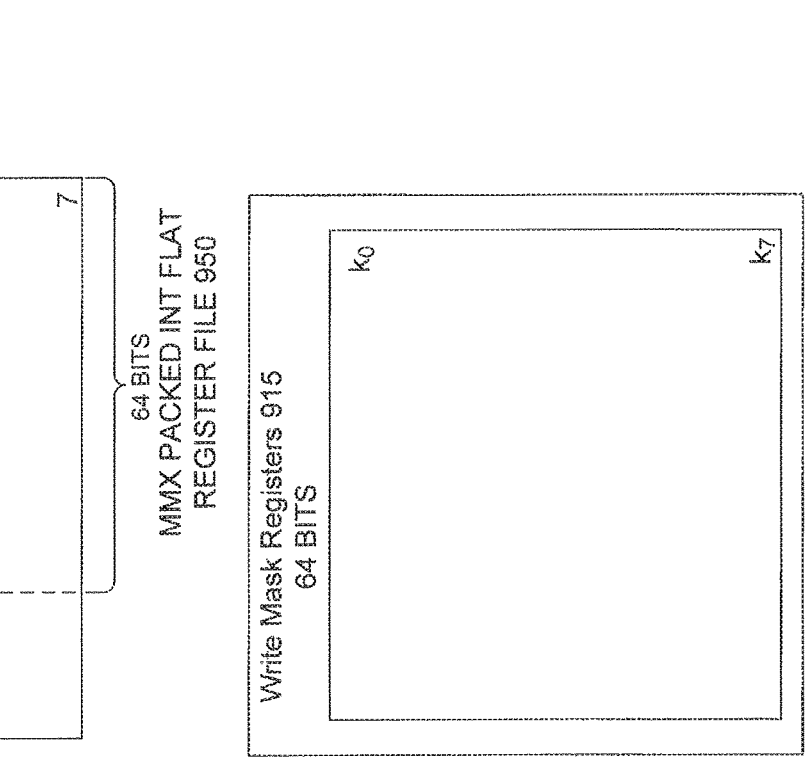
FIG. 9 is a block diagram of a register architecture according to one embodiment of the invention.
Figure 9:
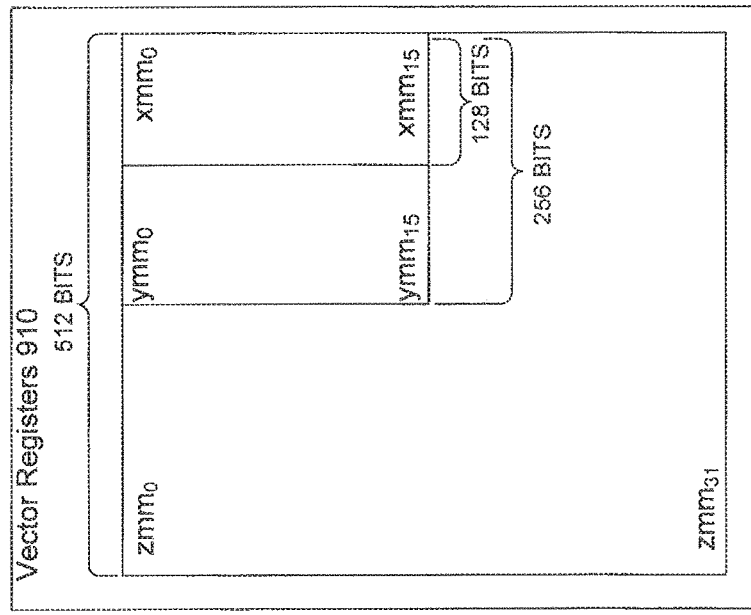

FIG. 9 is a block diagram of a register architecture 900 according to one embodiment of the invention. In the embodiment illustrated, there are 32 vector registers 910 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 800 operates on these overlaid register file as illustrated in the below tables.

| Adjustable Vector Length | Class | Operations | Registers |
|---|---|---|---|
| Instruction Templates that do not include the vector length field 759B | A (FIG. 7A; U = 0) | 710, 715, 725, 730 | zmm registers (the vector length is 64 byte) |
| | B (FIG. 7B; U = 1) | 712 | zmm registers (the vector length is 64 byte) |
| Instruction Templates that do include the vector length field 759B | B (FIG. 7B; U = 1) | 717, 727 | zmm, ymm, or xmm registers (the vector length is 64 byte, 32 byte, or 16 byte) depending on the vector length field 759B |

In other words, the vector length field 759B selects between a maximum length and one or more other shorter lengths, where each such shorter length is half the length of the preceding length; and instructions templates without the vector length field 759B operate on the maximum vector length. Further, in one embodiment, the class B instruction templates of the specific vector friendly instruction format 800 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 915—in the embodiment illustrated, there are 8 write mask registers (k0 through k7), each 64 bits in size. In an alternate embodiment, the write mask registers 915 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 925—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 945, on which is aliased the MMX packed integer flat register file 950—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figure 10A:
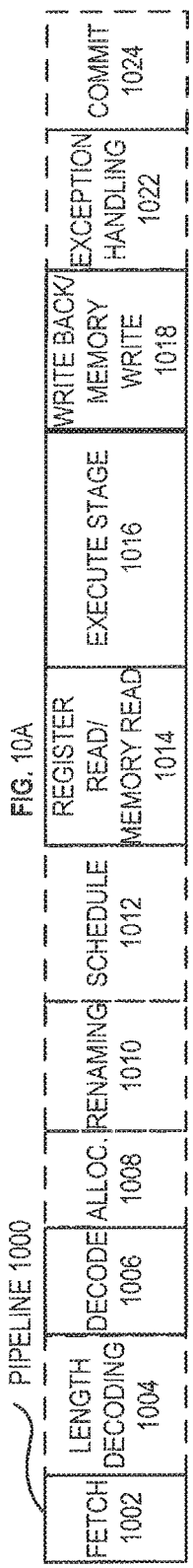
FIG. 10A is a block diagram illustrating both an exemplary in-order pipeline and an exemplary register renaming, out-of-order issue/execution pipeline according to embodiments of the invention.
Figure 10B:
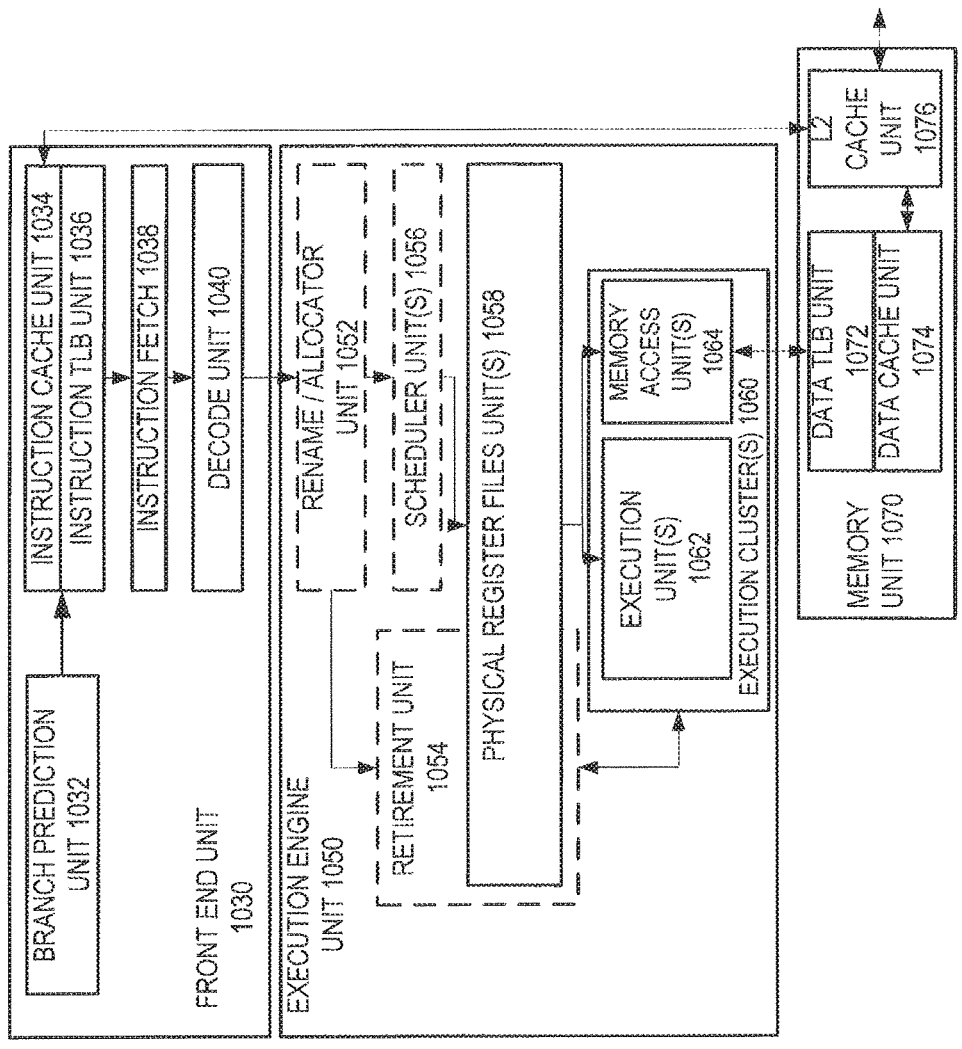
FIG. 10B is a block diagram illustrating both an exemplary embodiment of an in-order architecture core and an exemplary register renaming, out-of-order issue/execution architecture core to be included in a processor according to embodiments of the invention.

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB)

1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2, and/or some form of the generic vector friendly instruction format (U=0 and/or U=1) previously described), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 11B:
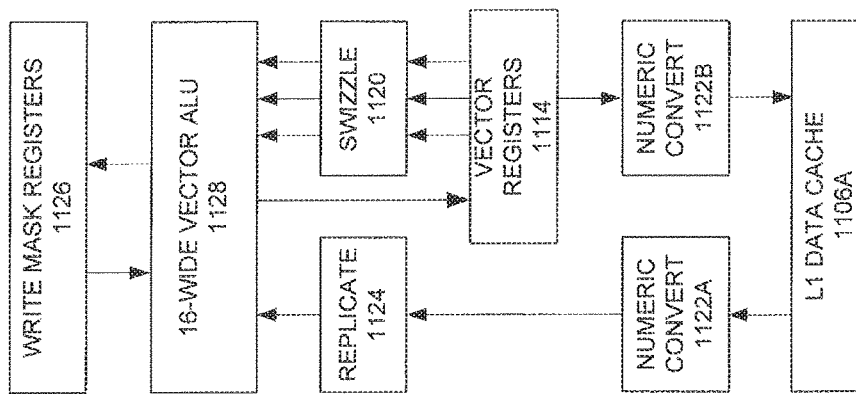
FIGS. 11A-B illustrate a block diagram of a more specific exemplary in-order core architecture, which core would be one of several logic blocks (including other cores of the same type and/or different types) in a chip.
Figure 11A:
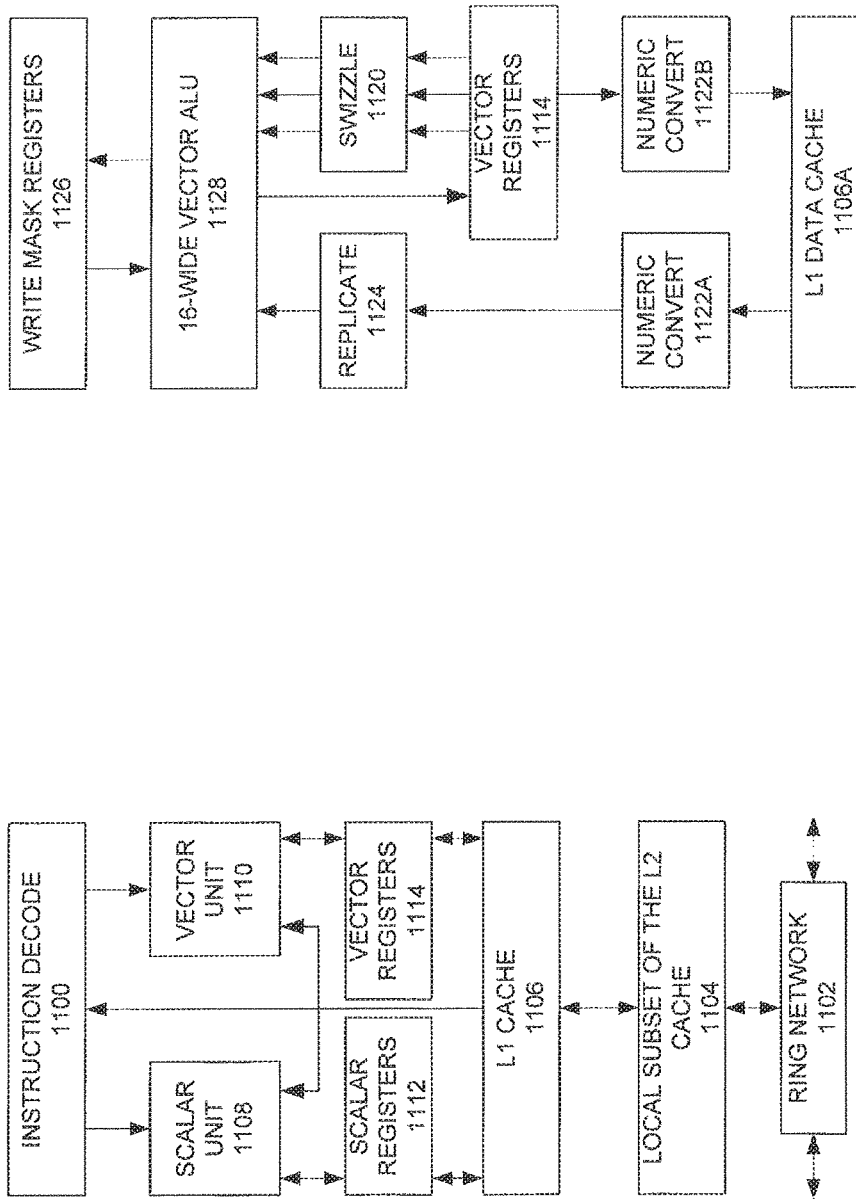

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Processor with Integrated Memory Controller and Graphics

Figure 12:
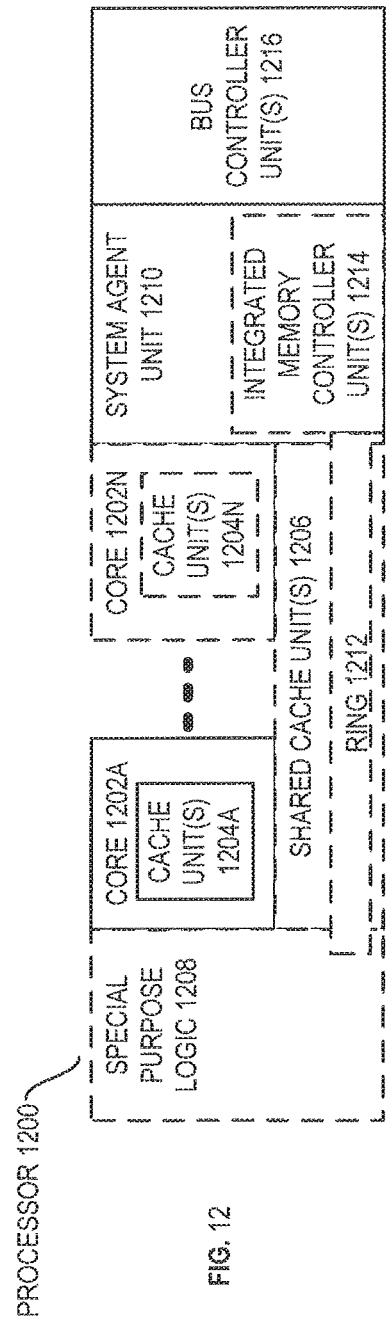
FIG. 12 is a block diagram of a processor that may have more than one core, may have an integrated memory controller, and may have integrated graphics according to embodiments of the invention.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multi-threading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
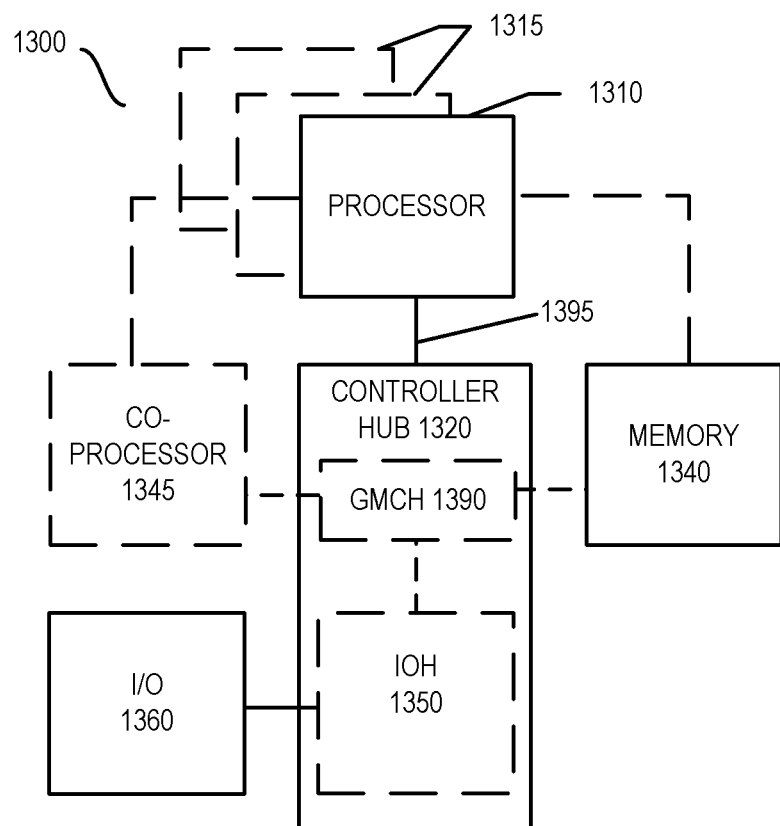
FIG. 13 is a block diagram of an exemplary system in accordance with an embodiment of the present invention.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
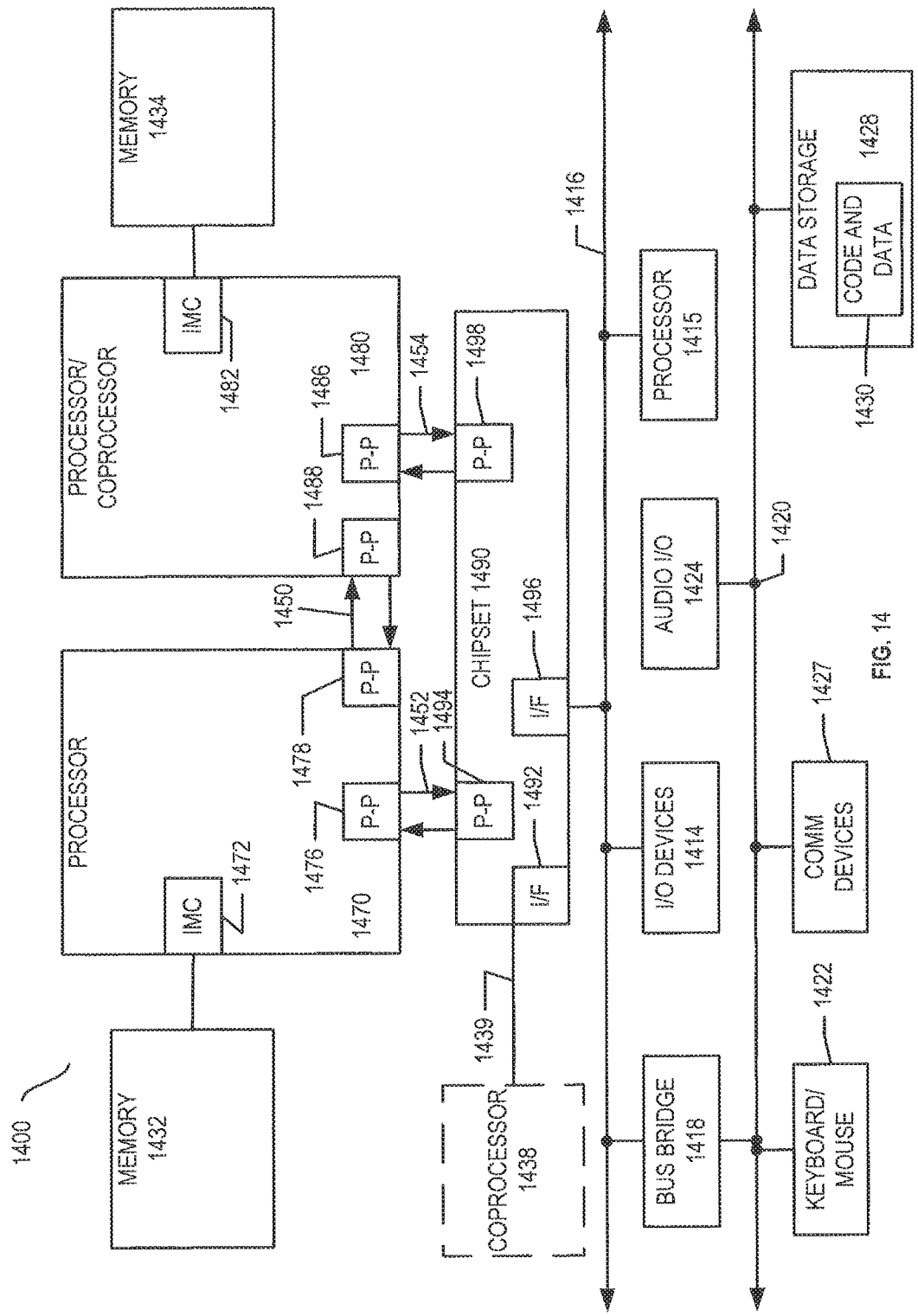
FIG. 14 is a block diagram of a first more specific exemplary system in accordance with an embodiment of the present invention.

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
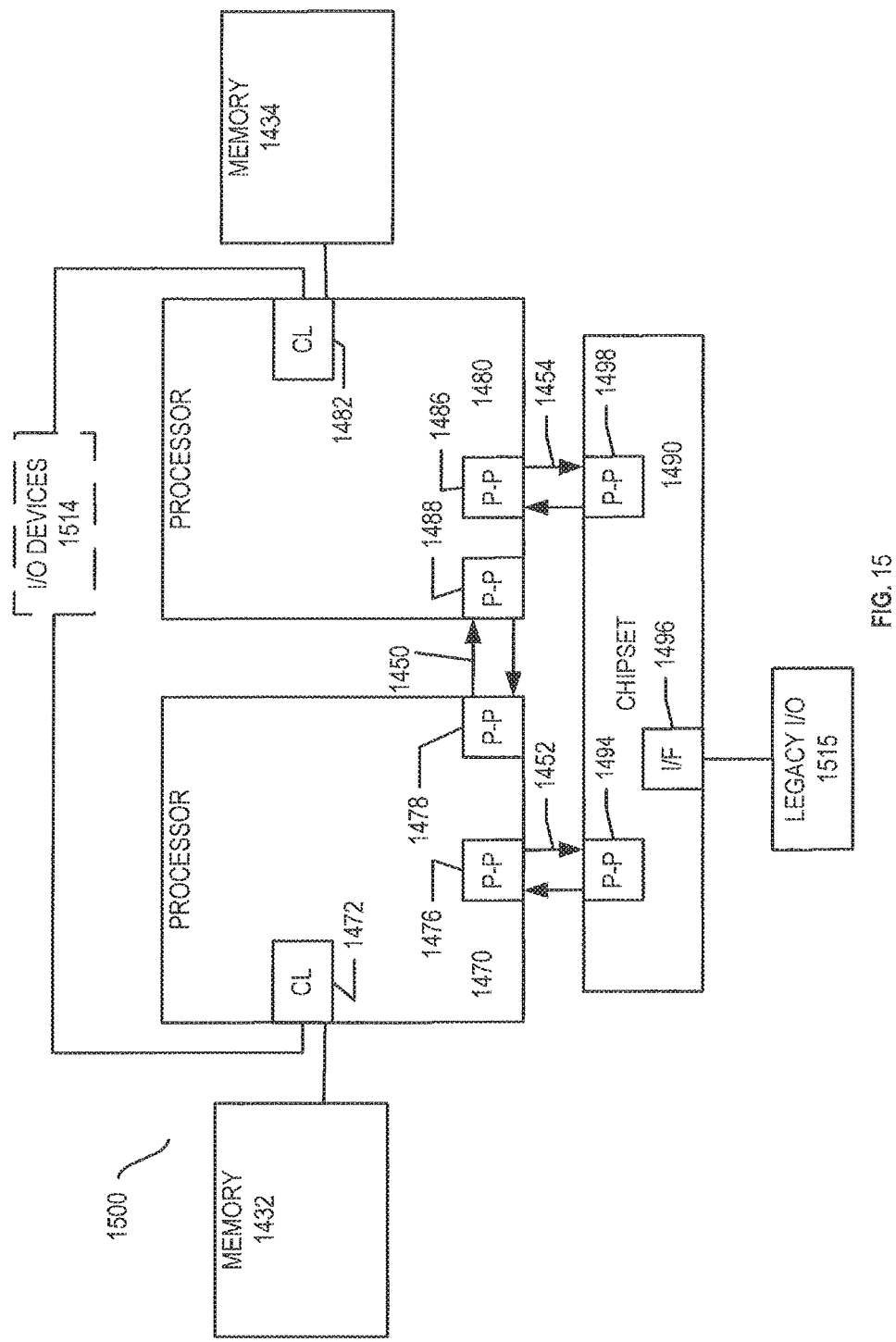
FIG. 15 is a block diagram of a second more specific exemplary system in accordance with an embodiment of the present invention.

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
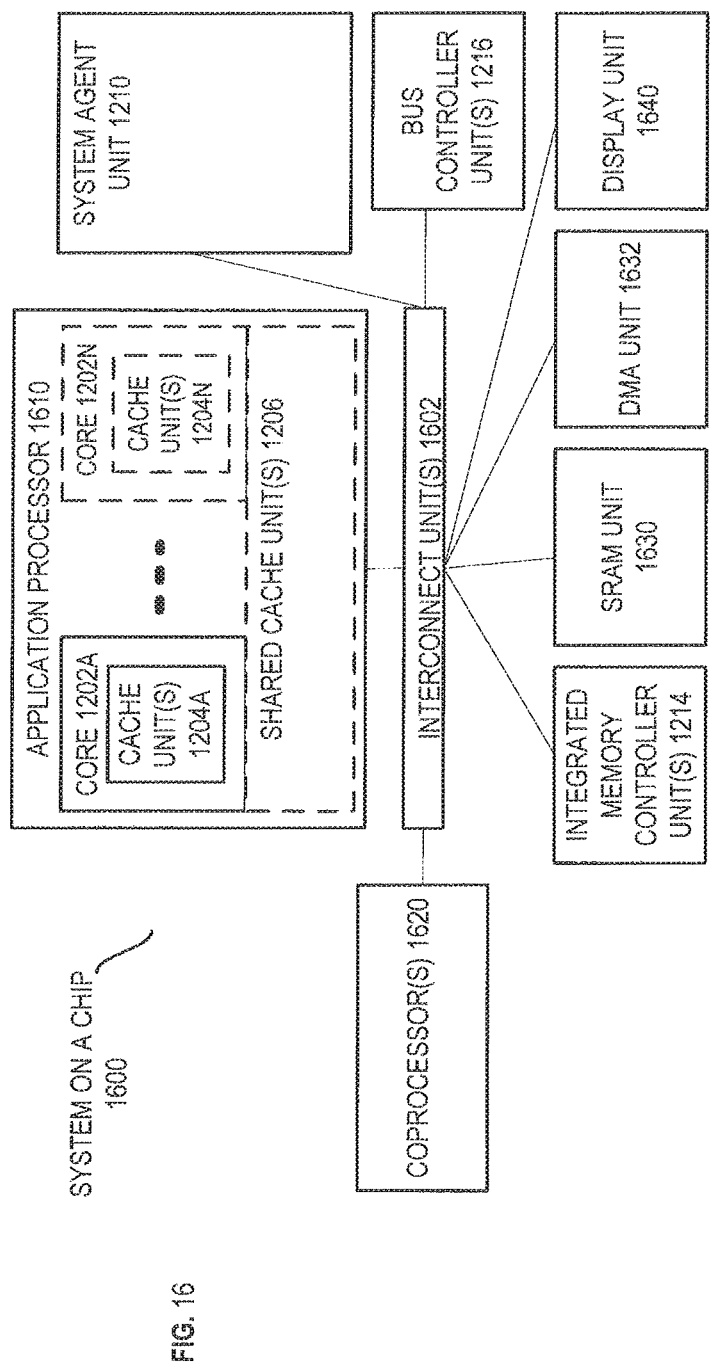
FIG. 16 is a block diagram of a SoC in accordance with an embodiment of the present invention.

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 202A-N and shared cache unit(s) 1206; a system agent unit 1210; a bus controller unit(s) 1216; an integrated memory controller unit(s) 1214;

a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
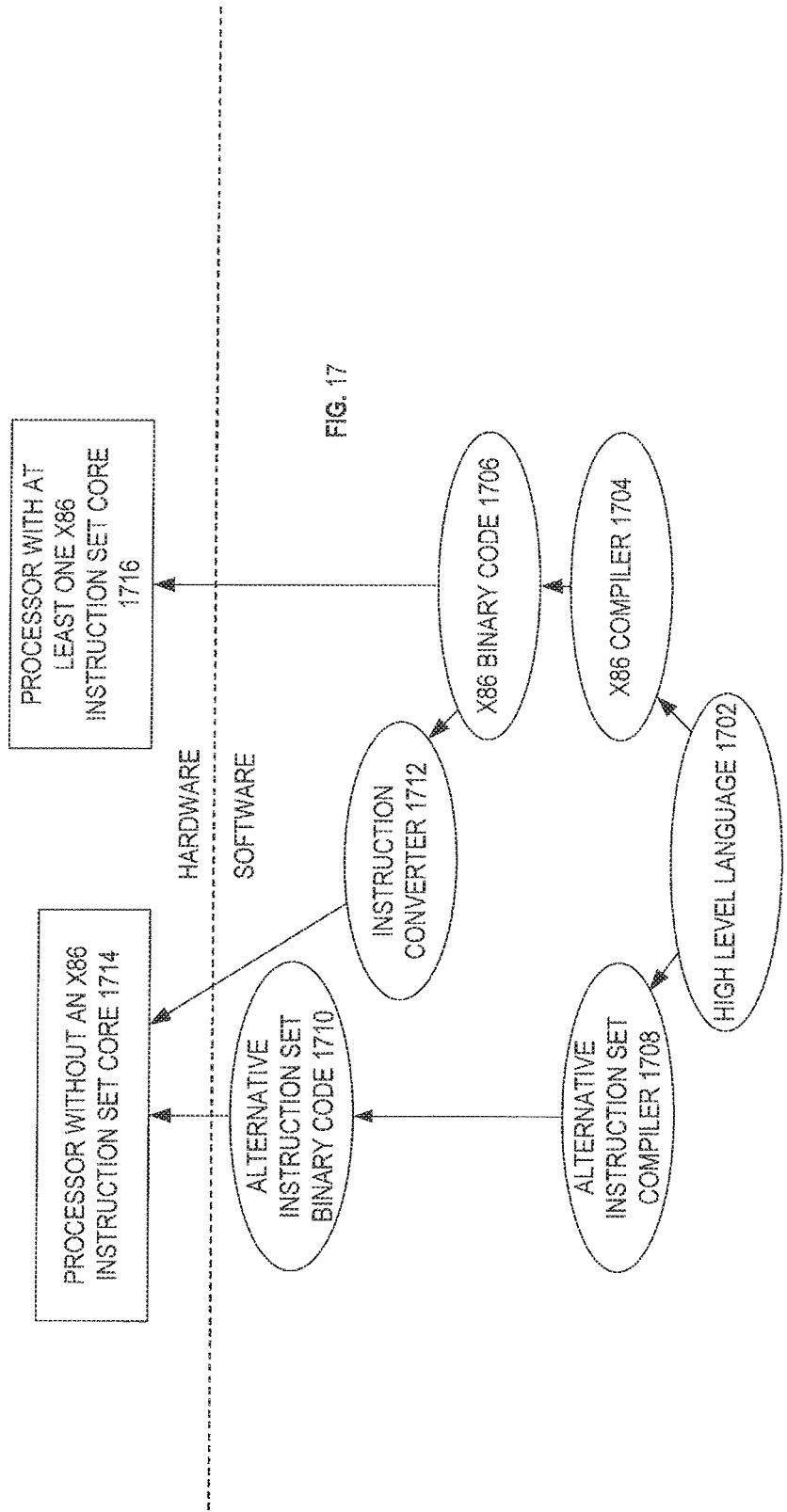
FIG. 17 is a block diagram contrasting the use of a software instruction converter to convert binary instructions in a source instruction set to binary instructions in a target instruction set according to embodiments of the invention.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system-on-a-chip (SoC) comprising:
a first one or more cores, a core comprising:
   a first decoder to decode instructions of a first instruction set architecture including loop control instructions, wherein the first decoder is to decode scalar instructions and vector instructions;
   first execution circuitry to execute one or more of the loop control instructions to implement a nested instruction loop comprising an outer loop of instructions and an inner loop of instructions nested within the outer loop of instructions, wherein the outer loop of instructions is to be repeated a first number of times and the inner loop of instructions to be repeated a second number of times, the first execution circuitry comprising:
      scalar execution circuitry to execute the scalar instructions, and
      vector execution circuitry to execute the vector instructions;
   a plurality of registers to store loop control values to be used by the first execution circuitry to control the nested instruction loop, the loop control values comprising:
      a first loop counter value for the inner loop, and
      a second loop counter value for the outer loop;
   wherein, responsive to the one or more loop control instructions, the first execution circuitry to implement the inner loop and the outer loop, based on the first loop counter value and the second loop counter value, respectively;
   wherein upon each iteration of the inner loop the first execution circuitry is to decrement the first loop counter value and wherein upon each iteration of the outer loop the first execution circuitry is to decrement the outer loop counter value; and
   wherein a current iteration of the inner loop or outer loop is to end when the first loop counter value or second loop counter value, respectively, reaches a minimum value;
a second one or more cores to execute instructions of a second instruction set architecture different from the first instruction set architecture, a core of the second plurality of cores comprising a second decoder to decode the instructions of the second instruction set architecture and second execution circuitry to execute the instructions of the second instruction set architecture;
a third one or more cores comprising graphics cores to execute graphics instructions of a third instruction set architecture different from the first and second instruction set architectures;
a system-level cache to be shared between the first one or more cores, the second one or more cores, and the third one or more cores;
an integrated memory controller to couple the first one or more cores, the second one or more cores, and the third one or more cores to a system memory device; and
a network processor coupled to one or more of the first one or more cores, the second one or more cores, and the third one or more cores.

2. The processor of claim 1 wherein the first and second loop counter values are read from a source register responsive to execution of the one or more loop counter instructions.

3. The processor of claim 1 wherein the second number of times is equal to the first number of times.

4. The processor of claim 1 further comprising:
memory management circuitry coupled to the first execution circuitry to translate virtual addresses within a virtual address space to be used by the first execution circuitry to execute the instructions.

5. The processor of claim 1, wherein the second one or more cores comprise cores of a central processing unit (CPU).

6. The processor of claim 5 further comprising:
a level 1 (L1) cache integral to each of the second one or more cores; and
a Level 3 (L3) cache to be shared by two or more of the second one or more cores.

7. The processor of claim 5 wherein the first one or more cores comprise cores of a digital signal processor (DSP).

* * * * *